US007725547B2

(12) United States Patent
Albertson et al.

(10) Patent No.: US 7,725,547 B2
(45) Date of Patent: May 25, 2010

(54) INFORMING A USER OF GESTURES MADE BY OTHERS OUT OF THE USER'S LINE OF SIGHT

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 11/470,421

(22) Filed: Sep. 6, 2006

(65) Prior Publication Data

US 2008/0059578 A1 Mar. 6, 2008

(51) Int. Cl.
*G06F 15/16* (2006.01)
*G06F 3/033* (2006.01)
*G06K 9/00* (2006.01)
(52) U.S. Cl. .................. 709/206; 715/863; 382/107; 382/154
(58) Field of Classification Search .......... 709/206; 715/863; 382/107, 154
See application file for complete search history.

(56) References Cited

U.S. PATENT DOCUMENTS

| | | | |
|---|---|---|---|
| 5,691,693 A | | 11/1997 | Kithil |
| 5,714,698 A | * | 2/1998 | Tokioka et al. .............. 73/865.4 |
| 5,880,731 A | * | 3/1999 | Liles et al. ................... 715/758 |
| 6,002,808 A | * | 12/1999 | Freeman ...................... 382/288 |

(Continued)

FOREIGN PATENT DOCUMENTS

EP 0905644 A 3/1999

(Continued)

OTHER PUBLICATIONS

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

(Continued)

*Primary Examiner*—George C Neurauter, Jr.
(74) *Attorney, Agent, or Firm*—David A. Mims, Jr.; Amy J. Pattillo

(57) ABSTRACT

A gesture-enabled electronic communication system informs users of gestures made by other users participating in a communication session. The system captures a three-dimensional movement of a first user from among the multiple users participating in an electronic communication session, wherein the three-dimensional movement is determined using at least one image capture device aimed at the first user. The system identifies a three-dimensional object properties stream using the captured movement and then identifies a particular electronic communication gesture representing the three-dimensional object properties stream by comparing the identified three-dimensional object properties stream with multiple electronic communication gesture definitions. In response to identifying the particular electronic communication gesture from among the multiple electronic communication gesture definitions, the system transmits, to the users participating in the electronic communication session, an electronic object corresponding to the identified electronic communication gesture.

18 Claims, 8 Drawing Sheets

U.S. PATENT DOCUMENTS

| | | | | |
|---|---|---|---|---|
| 6,072,494 | A * | 6/2000 | Nguyen | 715/863 |
| 6,115,053 | A | 9/2000 | Perlin | |
| 6,181,343 | B1 * | 1/2001 | Lyons | 715/850 |
| 6,215,890 | B1 * | 4/2001 | Matsuo et al. | 382/103 |
| 6,421,453 | B1 | 7/2002 | Kanevsky | |
| 6,577,937 | B1 | 6/2003 | Shuman | |
| 6,766,036 | B1 | 7/2004 | Pryor | |
| 6,784,901 | B1 * | 8/2004 | Harvey et al. | 715/757 |
| 6,788,809 | B1 * | 9/2004 | Grzeszczuk et al. | 382/154 |
| 6,859,144 | B2 | 2/2005 | Newman et al. | |
| 7,039,676 | B1 * | 5/2006 | Day et al. | 709/204 |
| 7,058,204 | B2 | 6/2006 | MacDougall et al. | |
| 7,224,830 | B2 * | 5/2007 | Nefian et al. | 382/154 |
| 7,274,800 | B2 * | 9/2007 | Nefian et al. | 382/103 |
| 2002/0004629 | A1 | 1/2002 | Natori | |
| 2002/0118880 | A1 | 8/2002 | Liu | |
| 2002/0152010 | A1 | 10/2002 | Colmenarez | |
| 2003/0058111 | A1 | 3/2003 | Lee et al. | |
| 2003/0076300 | A1 | 4/2003 | Lauper | |
| 2003/0113018 | A1 | 6/2003 | Nefian | |
| 2003/0142068 | A1 | 7/2003 | DeLuca | |
| 2003/0156756 | A1 | 8/2003 | Gortuk | |
| 2003/0227453 | A1 * | 12/2003 | Beier et al. | 345/419 |
| 2005/0030184 | A1 | 2/2005 | Victor | |
| 2005/0069852 | A1 * | 3/2005 | Janakiraman et al. | 434/236 |
| 2005/0166163 | A1 | 7/2005 | Chang | |
| 2005/0206610 | A1 * | 9/2005 | Cordelli | 345/156 |
| 2005/0210419 | A1 * | 9/2005 | Kela et al. | 715/863 |
| 2006/0013440 | A1 | 1/2006 | Cohen | |
| 2007/0063855 | A1 | 3/2007 | Maass | |
| 2009/0274339 | A9 | 11/2009 | Cohen et al. | |

FOREIGN PATENT DOCUMENTS

| | | | |
|---|---|---|---|
| EP | 0991011 | A | 4/2000 |
| EP | 1723901 | A | 11/2006 |
| FR | 2784887 | A | 4/2000 |
| WO | 0002187 | A | 1/2000 |
| WO | 2004108466 | A | 12/2004 |

OTHER PUBLICATIONS

"What is Photosynth", Microsoft Live Labs, copyright Microsoft Corporation 2006, 1 page, [online], [print accessed on Aug. 18, 2006]. Retrieved from the internet < http://labs.live.com/photosynth/whatis/>.

[online], [print accessed on Aug. 18, 2006]. Retrieved from the Internet <http://www.sandia.gov/RADAR/whatis.html>.

"Method for Access Control Via Gesural Verification", IBM Technical Disclosure Bulletin, IBM Corp, New York, US, vol. 36, No. 9B, Sep. 1, 1993, pp. 487-488, 2 pages.

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning A User About Adverse Bahaviors of Others Within an Environment Based on a 3D Captured Image Stream", U.S. Appl. No. 11/622,676, filed Jan. 12, 2007.

Jacob C Albertson et al, "Adjusting A Consumer Experience Based on a 3D Captured Image Stream of a Consumer Response", U.S. Appl. No. 11/622,679, filed Jan. 12, 2007.

Jacob C Albertson et al, "Warning a Vehicle Operator of Unsafe Operation Behavior Based on a 3D Captured Image Stream", U.S. Appl. No. 11/622,684, filed Jan. 12, 2007.

Jacob C Albertson et al, "Tracking A Range of Body Movement Based on 3D Captured Image Streams of a User", U.S. Appl. No. 11/622,685, filed Jan. 12, 2007.

Jacob C Albertson et al, "Controlling Resource Access Based on User Gesturing in a 3D Captured Image Stream of the User", U.S. Appl. No. 11/622,687, filed Jan. 12, 2007.

Jacob C Albertson et al, "Controlling a Document Based on User Behavioral Signals Detected from a 3D Captured Image Stream", U.S. Appl. No. 11/622,690, filed Jan. 12, 2007.

Jacob C Albertson et al, "Controlling a System Based on User Behavioral Signals Detected from a 3D Captured Image Stream", U.S. Appl. No. 11/622,693, filed Jan. 12, 2007.

Jacob C Albertson et al, "Assisting a Vision-Impaired User with Navigation Based on a 3D Captured Image Stream", U.S. Appl. No. 11/622,696, filed Jan. 12, 2007.

USPTO Office Action, dated Jan. 14, 2010, in Re Albertson (U.S. Appl. No. 11/622,693, Filed Jan. 12, 2007, pp. 1-23.

USPTO Office Action, dated Jan. 15, 2010, in Re Albertson (U.S. Appl. No. 11/622,684, Filed Jan. 12, 2007, pp. 1-24.

\* cited by examiner

INFORMING A USER OF GESTURES MADE BY OTHERS OUT OF THE USER'S LINE OF SIGHT

1. TECHNICAL FIELD

The present invention relates in general to improved gesture identification. In particular, the present invention relates to detecting, from a three-dimensional image stream captured by one or more image capture devices, gestures made by others out of a user's line of sight and informing the user of the gestures made by others out of the user's line of sight.

2. DESCRIPTION OF THE RELATED ART

People do not merely communicate through words; non-verbal gestures and facial expressions are important means of communication. For example, instead of speaking "yes", a person may nod one's head to non-verbally communicate an affirmative response. In another example, however a person may speak the word "yes", but simultaneously shake one's head from side to side for "no", indicating to the listener that the spoken word "yes" is not a complete affirmation and may require that the listener further inquire as to the speaker's intentions. Thus, depending on the context of communication, a non-verbal gesture may emphasize or negate corresponding verbal communication.

In many situations, while a speaker may communicate using non-verbal gesturing, the listener may not have a line of sight to observe the non-verbal communication of the speaker. In one example of a lack of line of sight during communication, a person with some type of sight impairment may not be able to observe the gesturing of another person. In another example of a lack of line of sight during communication, two or more people communicating through an electronic communication, for example whether over the telephone, through text messaging, or during an instant messaging session, typically do not have a line of sight to observe each other's non-verbal communication.

In one attempt to provide long-distance communications that include both verbal and non-verbal communications, some service providers support video conferencing. During a video conference, a video camera at each participant's computer system captures a stream of video images of the user and sends the stream of video images to a service provider. The service provider then distributes the stream of video images of each participant to the computer systems of the other participants for the other participants to view. Even when two or more people communicate via a video conference, however, viewing a two dimensional video image is a limited way to detect non-verbal communication. In particular, for a gesture to be properly interpreted, a third dimension of sight may be required. In addition, when a gesture is made in relation to a particular object, a two dimensional video image may not provide the viewer with the proper perspective to understand what is being non-verbally communicated through the gesture in relation to the particular object. Further, gestures made with smaller movement, such as facial expressions, are often difficult to detect from a two dimensional video image to understand what is being non-verbally communicated. For example, it can be detected from a person's jaw thrust forward that the person is angry, however it is difficult to detect a change in a person's jaw position from a two dimensional video image.

In view of the foregoing, there is a need for a method, system, and program for detecting three-dimensional movement of a first user participating in a communication with a second user who does not have a direct line of sight of the first user, properly identifying a gesture from the detected movement, and communicating the gesture to the second user.

SUMMARY OF THE INVENTION

Therefore, the present invention provides improved gesture identification from a three-dimensional captured image. In particular, the present invention provides for detecting, from a three-dimensional image stream captured by one or more image capture devices, gestures made by others out of a user's line of sight and informing the user of the gestures made by others out of the user's line of sight.

In one embodiment, a gesture-enabled electronic communication system informs users of gestures made by other users participating in a communication session. The system captures a three-dimensional movement of a first user from among the multiple users participating in an electronic communication session, wherein the three-dimensional movement is determined using at least one image capture device aimed at the first user. The system identifies a three-dimensional object properties stream using the captured movement and then identifies a particular electronic communication gesture representing the three-dimensional object properties stream by comparing the identified three-dimensional object properties stream with multiple electronic communication gesture definitions. In response to identifying the particular electronic communication gesture from among the multiple electronic communication gesture definitions, the system transmits, to the users participating in the electronic communication session, an electronic object corresponding to the identified electronic communication gesture.

In capturing the three-dimensional movement of the first user, the system may capture the three-dimensional movement using a stereoscopic video capture device to identify and track a particular three-dimensional movement. In addition, in capturing the three-dimensional movement of the first user, the system may capture the three-dimensional movement using at least one stereoscopic video capture device and at least one sensor enabled to detect a depth of a detected moving object in the three-dimensional movement. Further, in capturing the three-dimensional movement of the first user, the system may capture the three-dimensional movement of the first user when the first user is actively engaged in the electronic communication session by at least one of actively speaking and actively typing.

In addition, in identifying a particular electronic communication gesture representing the three-dimensional object properties stream, the system calculates a percentage certainty that the captured three-dimensional movement represents a particular gesture defined in the particular electronic communication gesture. The system also adjusts at least one output characteristic of the output object to represent the percentage certainty.

In transmitting the electronic object to the users, the system may transmit the electronic object as an entry by the first user in the electronic communication session. In addition, in transmitting the electronic object to the users, the system may transmit the electronic object as a command to a tactile detectable device to output a particular tactile detectable output pattern representative of the identified electronic communication gesture.

In addition, in transmitting the electronic object to users, the system may determine a separate electronic object to output to each user. The system accesses, for each user, a user profile with a preference selected for a category of output object to output based on factors such as the identities of the other users, the device used by the user to participate in the electronic communication session, and the type of electronic communication session. Based on the category of output object, for each user, the system selects a particular output object specified for the category for the identified electronic communication gesture. The system transmits each separately selected output object to each user according to user preference.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
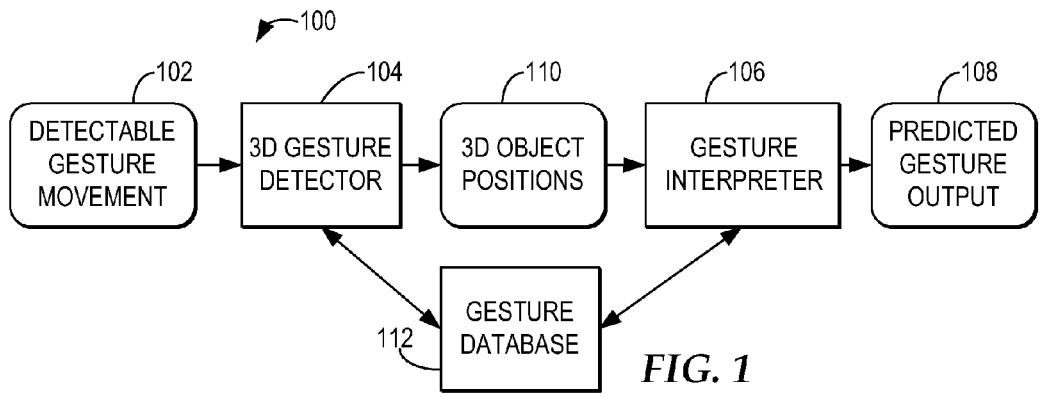
FIG. 1 is a block diagram illustrating a flow of information in a gesture processing method, system, and program.

With reference now to FIG. 1, a block diagram illustrates a flow of information in a gesture processing method, system, and program. It is important to note that as used throughout, the term "gesture" may include user actions typically labeled as gestures and may also include any detectable body movements, body posture, and other types of non-verbal communication.

In the example, a gesture processing system 100 includes a three-dimensional (3D) gesture detector 104. 3D gesture detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D properties of the captured objects, as illustrated by 3D object properties 110. Object properties may include, but are not limited to, positions, color, size, and orientation.

In the example, 3D gesture detector 104 captures images within a focus area, represented as detectable gesture movement 102. In addition, 3D gesture detector 104 may detect other types of data within a focus area. In particular, 3D gesture detector 104 detects detectable gesture movement 102 through multiple types of image and data detection including, but not limited to, capturing video images, detecting body part movement, detecting skin texture, detecting skin color, and capturing thermal images. For supporting multiple types of image and data detection, 3D gesture detector 104 may include multiple types of image capture devices, including one or more video cameras arranged for stereoscope video image capture, and other types of sensors, such as thermal body imaging sensors, skin texture sensors, laser sensing devices, sound navigation and ranging (SONAR) devices, or synthetic laser or sonar systems. Portions of detectable gesture movement 102 may include images and other data representative of actual gestures and other portions of detectable gesture movement 102 may include images and data not representative of gestures. In addition, detectable gesture movement 102 may include one or more of both moving objects and stationary objects.

3D gesture detector 104 translates detectable gesture movement 102 into a stream of 3D properties of detected objects and passes the stream of 3D object properties 110 to gesture interpreter 106. Gesture interpreter 106 maps the streamed 3D object properties 110 into one or more gestures and estimates, for each predicted gesture, the probability that the detected movement of the detected objects represents the predicted gesture.

Gesture interpreter 106 outputs each predicted gesture and percentage certainty as predicted gesture output 108. Gesture interpreter 106 may pass predicted gesture output 108 to one or more gesture-enabled applications at one or more systems.

In particular, in processing detectable gesture movement 102 and generating predicted gesture output 108, 3D gesture detector 104 and gesture interpreter 106 may access a gesture database 112 of previously accumulated and stored gesture definitions to better detect objects within detectable gesture movement 102 and to better predict gestures associated with detected objects.

In addition, in processing gesture movement 102 and generating predicted gesture output 108, 3D gesture detector 104 and gesture interpreter 106 may access gesture database 112 with gesture definitions specified for the type of gesture-enabled application to which predicted gesture output 108 will be output. For example, in the present embodiment, predicted gesture output 108 may be output to a communication service provider, for the communication service provider to insert into a communication session, such that gesture interpreter 106 attempts to predict a type of gesture from a detected object movement that more closely resembles a type of gesture that has been determined to be more likely to occur during an electronic communication.

Further, in processing gesture movement 102 and generating predicted gesture output 108, 3D gesture detector 104 and gesture interpreter 106 attempt to identify objects representative of gestures and predict the gesture made in view of the overall interaction in which the gesture is made. Thus, 3D gesture detector 104 and gesture interpreter 106 attempt to determine not just a gesture, but a level of emphasis included in a gesture that would effect the meaning of the gesture, a background of a user making a gesture that would effect the meaning of the gesture, the environment in which the user makes the gesture that would effect the meaning of the gesture, combinations of gestures made together that effect the meaning of each gesture and other detectable factors that effect the meaning of a gesture. Thus, gesture database 112 includes gestures definitions corresponding to different types of cultures, regions, and languages. In addition, gesture database 112 includes gesture definitions adjusted according to a corresponding facial expression or other gesture. Further, gesture database 112 may be trained to more accurately identify objects representing particular people, animals, places, or things that a particular user most commonly interacts with and therefore provide more specified gesture definitions.

In addition, in processing gesture movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D gesture detectors or between gesture interpreters, such that with the combination of data gesture interpreter 106 may interpreter gestures with greater accuracy.

Figure 2:
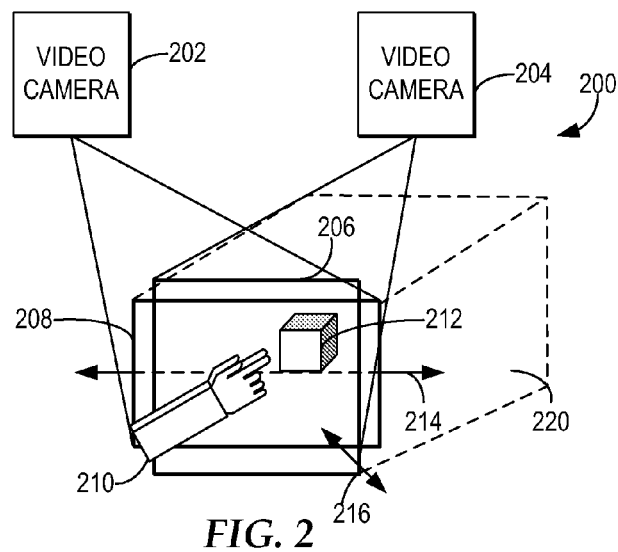
FIG. 2 is an illustrative diagram depicting an example of an environment in which a 3D gesture detector captures and generates the 3D object properties representative of detectable gesture movement.

Referring now to FIG. 2, an illustrative diagram depicts an example of an environment in which a 3D gesture detector captures and generates the 3D object properties representative of detectable gesture movement. It will be understood that detectable gesture movement environment 200 is one example of an environment in which 3D gesture detector 104 detects images and data representative of detectable gesture movement 102, as described with reference to gesture processing system 100 in FIG. 1. Other environments may be implemented in which gesture movement is detected and processed.

In the example, detectable gesture movement environment 200 includes a stereoscopic capture device comprising a video camera 202 and a video camera 204, each positioned to detect movement of one or more objects within a combined 3D focus area 220. In the depicted embodiment, video camera 202 and video camera 204 may each be positioned on one stationary axis or separate stationary axis, such that the area represented by 3D focus area 220 remains constantly focused upon. In addition, in the depicted embodiment, video camera 202 and video camera 204 and any other sensors (not depicted) may be positioned in parallel, at tangents, or at any other angles to control the span of and capture images within 3D focus area 220.

In another embodiment, video camera 202 and video camera 204 may each be positioned on a position adjustable axis or the actual focus point of video camera 202 and video camera 204 may be adjustable, such that the area represented by 3D focus area 220 may be repositioned. In one example, each of video camera 202 and video camera 204 are coupled with a thermal imaging devices that detects thermal imaging based movement within a broad area and directs the repositioning of the focus area of each of video camera 202 and video camera 204 to track the thermal movement within the focus area of each camera.

In yet another embodiment, video camera 202 and video camera 204 may be affixed to an apparatus that is carried by a mobile entity. For example, video camera 202 and video camera 204 may be affixed to a pair of glasses or other headwear for a person, such that 3D focus area 220 changes as the user moves. In another example, video camera 202 and video camera 204 may be affixed to a moving machine, such as a vehicle, such that 3D focus area 220 changes as the vehicle moves.

In another embodiment, only a single video camera, such as video camera 202, may be implemented for stereoscopic image capture. The single video camera is placed on a track or other adjustable axis and a controller adjusts the position of the single video camera along the track, wherein the single video camera then captures a stream of video images within a focus area at different positioned points along the track and 3D gesture detector 104 combines the stream of images into a 3D object property stream of the properties of detectable objects.

For purposes of example, 3D focus area 220 includes a first capture plane 206, captured by video camera 202 and a second capture plane 208, captured by video camera. First capture plane 206 detects movement within the plane illustrated by reference numeral 214 and second capture plane 208 detects movement within the plane illustrated by reference numeral 216. Thus, for example, video camera 202 detects movement of an object side to side or up and down and video camera 204 detects movement of an object forward and backward within 3D focus area 220.

In the example, within 3D focus area 220, a hand 210 represents a moving object and a box 212 represents a stationary object. In the example, hand 210 is the portion of a user's hand within 3D focus area 220. The user may make any number of gestures, by moving hand 210. As the user moves hand 210 within 3D focus area, each of video camera 202 and video camera 204 capture a video stream of the movement of hand 210 within capture plane 206 and capture plane 208. From the video streams, 3D gesture detector 104 detects hand 210 as a moving object within 3D focus area 220 and generates a 3D property stream, representative of 3D object properties 110, of hand 210 over a period of time.

In addition, a user may make gestures with hand 210 in relation to box 212. For example, a user may point to box 212 to select a product for purchase in association with box 212. As the user moves hand 210 within 3D focus area, the video streams captured by video camera 202 and video camera 204 include the movement of hand 210 and box 212. From the video streams, 3D gesture detector 104 detects hand 210 as a moving object and box 212 as a stationary object within 3D focus area 220 and generates a 3D object property stream indicating the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D gesture detector 104 can more accurately detect and define a 3D representation of stationary objects and moving objects, including gestures, within 3D focus area 220. In addition, the more accurately that 3D gesture detector 104 defines a 3D representation of a moving object, the more accurately gesture interpreter 106 can predict a gesture from the 3D model. For example, a gesture could consist of a user making a motion directly towards or away from one of video camera 202 and video camera 204 which would not be able to be captured in a two dimensional frame; 3D gesture detector 104 detects and defines a 3D representation of the gesture as a moving object and gesture interpreter 106 predicts the gesture made by the movement towards or away from a video camera from the 3D model of the movement.

In addition, it is important to note that while FIG. 2 illustrates a gesturing hand 210 and a stationary box 212, in alternate embodiments, 3D focus area 220 may include multiple separate people making gestures, that video camera 202 and video camera 204 capture images of multiple people making gestures, and 3D gesture detector 104 detects each gesture by each person as a separate object. In particular, 3D gesture detector 104 may detect, from the captured video images from video camera 202 and video camera 204, gestures with more motion, such as gestures made with hands, and gestures made with less motion, such as facial expressions, to accurately generate 3D object properties of a person's non-verbal communication and interaction with others.

Figure 3:
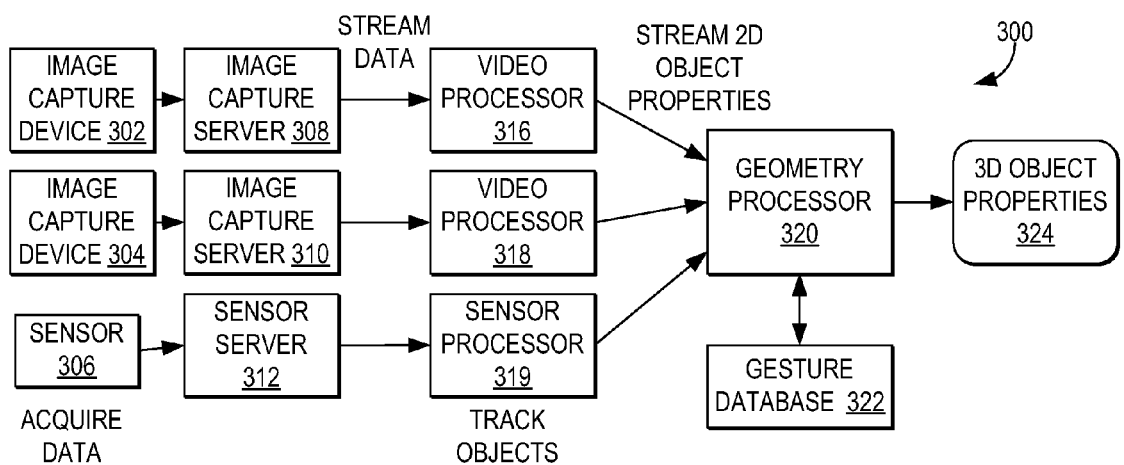
FIG. 3 is a block diagram illustrating one embodiment of a 3D gesture detector system.

With reference now to FIG. 3, a block diagram illustrates one embodiment of a 3D gesture detector system. It is important to note that the multiple components depicted within 3D gesture detector system 300 may be incorporated within a single system or distributed via a network, other communication medium, or other transport medium across multiple systems. In addition, it is important to note that additional or alternate components from those illustrated may be implemented in 3D gesture detector system 300 for capturing images and data and generating a stream of 3D object properties 324.

Initially, multiple image capture devices, such as image capture device 302, image capture device 304 and sensor 306, represent a stereoscopic image capture device for acquiring the data representative of detectable gesture movement 102 within a 3D focus area, such as 3D focus area 220. As previously illustrated, image capture device 302 and image capture device 304 may represent video cameras for capturing video images, such as video camera 202 and video camera 204. In addition, image capture device 302 and image capture device 304 may represent a camera or other still image capture device. In addition, image capture device 302 and image capture device 304 may represent other types of devices capable of capturing data representative of detectable gesture movement 102. Image capture device 302 and image capture device 304 may be implemented using the same type of image capture system or different types of image capture systems. In addition, the scope, size, and location of the capture area and plane captured by each of image capture device 302 and image capture device 304 may vary. Further, as previously described with reference to FIG. 2, each of image capture device 302, image capture device 304, and sensor 306 may be positioned on a stationary axis or a movable axis and may be positioned in parallel, at tangents, or at any other angles to adjust the span of the capture area and capture images within the capture area.

Sensor 306 may represent one or more different types of sensors, including, but not limited to, thermal body imaging sensors, skin texture sensors, laser sensing devices, sound navigation and ranging (SONAR) devices, or synthetic laser or sonar systems. In addition, sensors 306 may include sensors that detect particular type of body part, a particular type of body movement or skin texture.

In particular, sensor 306 detects information about objects in a particular focus area that enhances the ability to create the 3D object properties. For example, by implementing sensor 306 through a SONAR device, sensor 306 collects additional information about the depth of an object and the distance from the SONAR device to the object, where the depth measurement is used by one or more of video processor 316, video processor 308, or a geometry processor 320 to generate 3D object properties 324. If sensor 306 is attached to a moving object, a synthetic SONAR device may be implemented.

Each of image capture device 302, image capture device 304, and sensor 306 transmit captured images and data to one or more computing systems enabled to initially receive and buffer the captured images and data. In the example, image capture device 302 transmits captured images to image capture server 308, image capture device 304 transmits captured images to image capture server 310, and sensor 306 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 302, image capture device 304, and sensor device 306 to one or more processors. In the example, camera server 308 streams images to a video processor 316, camera server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image server 308 and image server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images.

In the example, video processor 316, video processor 318, and sensor processor 319 each create and stream the properties, including positions, color, size, and orientation, of the detected objects to a geometry processor 320. In one example, each processed frame streamed to geometry processor 320 may include, but is not limited to, a camera ID, a frame number, a time stamp, and X axis coordinates (x_loc) and Y axis coordinates (y_loc). It is important to note that x_loc and y_loc may each include multiple sets of points and other data that identify all the properties of an object. If multiple objects are detected within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from video processor 319. Geometry processor 320 matches up the streamed 2D object properties and other data for each of the objects. In addition, geometry processor 320 constructs 3D object properties 324 of each of the detected objects from the streamed 2D object properties and other data. In particular, geometry processor 320 constructs 3D object properties 324 that include the depth of an object. In one example, each 3D object property record constructed by geometry processor 320 may include a time stamp, X axis coordinates (x_loc), Y axis coordinates (y_loc), and Z axis coordinates (z_loc).

At any of video processor 316, video processor 318, sensor processor 319, and geometry processor 320 property records may include at least one identifier to enable persistence in tracking the object. For example, the identifier may include a unique identifier for the object itself and also an identifier of a class or type of object.

In particular, in video processor 316, video processor 318, and sensor processor 319 identifying and classifying object properties, each of the processors may access a gesture database 322 for accessing previously processed inputs and gesture mappings to more accurately identify and classify 2D object properties detect and match the streamed 2D object properties to an object, In addition, geometry processor 320 may more accurately construct 3D properties of objects based on the streamed 2D object properties, based on previously matched and constructed 3D properties of objects accessed from gesture database 322. Further, gesture database 322 may store the streamed 2D object properties and 3D object properties for future reference.

In addition, in video processor 316, video processor 318, and sensor processor 319 identifying and classifying object properties and in geometry processor constructing 3D object properties 324, each of the processors may identify detected objects or the environment in which an object is located. For example, video processor 316, video processors 318, sensor processor 319, and geometry processor 320 may access gesture database 322, which includes specifications for use in mapping facial expressions, performing facial recognition, and performing additional processing to identify an object. In addition, video processor 316, video processors 318, sensor processor 319, and geometry processor 320 may access gesture database 322, which includes specifications for different types of physical environments for use in identifying a contextual environment in which a gesture is made. Further, in constructing 3D object properties 324, video processor 316, video processors 318, sensor processor 319, and geometry processor 320 may identify the interactions between multiple detected objects in the environment in which the object is located. By monitoring and identifying interactions between objects detected in the environment in which the object is located, more accurate prediction of a gesture in the context in which the gesture is made may be performed.

Figure 4:
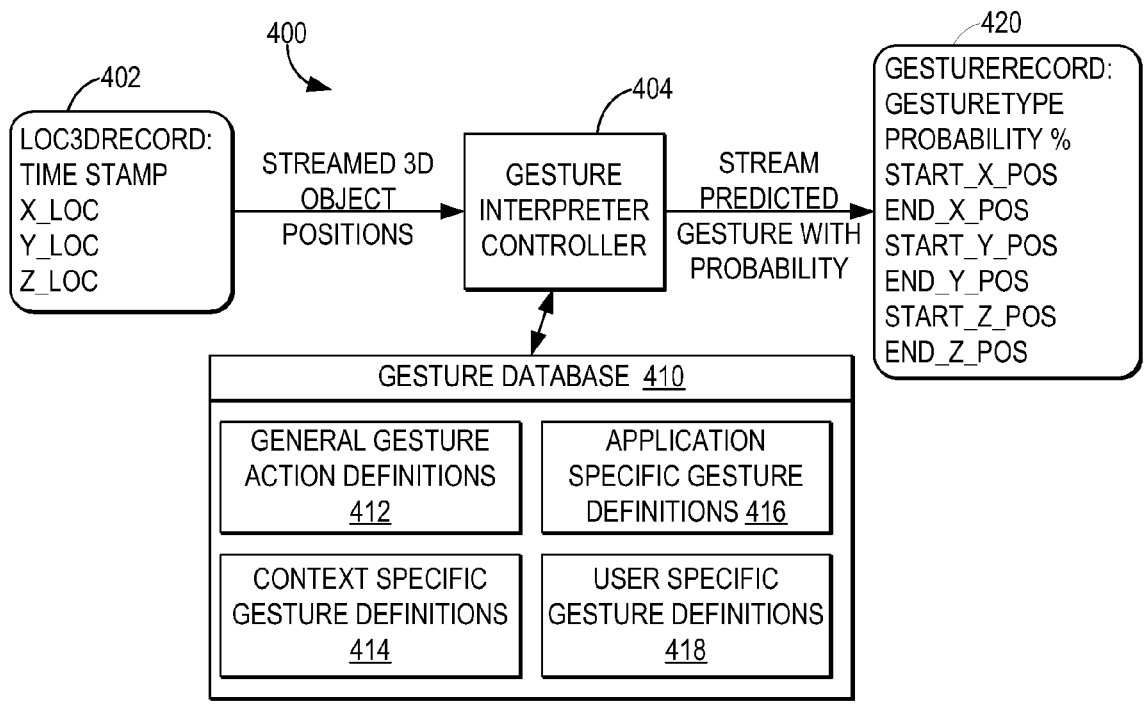
FIG. 4 is a block diagram depicting one embodiment of a gesture interpreter system.

Referring now to FIG. 4, a block diagram illustrates one embodiment of a gesture interpreter system. It is important to note that the multiple components depicted within 3D gesture interpreter system 400 may be incorporated within a single system or distributed via a network across multiple systems. In the example, a 3D object properties record 402 includes "time stamp", "x_loc", "y_loc", and "z-loc" data elements. It will be understood that 3D properties record 402 may include additional or alternate data elements as determined by geometry processor 320 of FIG. 3.

3D gesture interpreter system 400 includes a gesture interpreter controller 404, where gesture interpreter controller 404 may include one or more processors programmed to perform gesture interpretation. For example, gesture interpreter controller 404 may include a processor with the CellBE architecture, programmed to efficiently process 3D object properties data streams and predict gestures from the 3D object properties streams. In addition, gesture interpreter controller 404 may include processors upon which software runs, where the software directs processing of 3D object properties streams and predicting gestures from the 3D object properties streams.

In processing 3D object properties streams and predicting gestures, gesture interpreter controller 404 maps 3D object properties to one or more gesture actions with a percentage certainty that the streamed 3D object properties represent the mapped gesture actions. In particular, gesture interpreter controller 404 accesses one or more gesture definitions for one or more gestures and determines whether the 3D object properties match one or more characteristics of one or more gestures as defined in one or more of the gesture definitions. Gesture definitions may include mapped 3D models of one or more gestures. In addition, gesture definitions may define the parameters of identifying characteristics of a gesture including, but not limited to, body part detected, type of movement, speed of movement, frequency, span of movement, depth of movement, skin or body temperature, and skin color.

It is important to note that in interpreting 3D object properties streams, gesture interpreter controller 404 performs an aggregate analysis of all the tracked objects in one or more 3D object properties streams identified for a particular focus area by one or more gesture detector systems. In one example, gesture interpreter controller 404 aggregates the 3D object property streams for a particular focus area. In another example, gesture interpreter controller 404 may receive multiple 3D object properties streams from areas overlapping a focus area, analyze the 3D object properties streams for similarities, location indicators, and orientation indicators, and construct the 3D object properties streams into a 3D aggregate representation of an area.

In one embodiment, gesture interpreter controller 404 may map the aggregate of the tracked objects directly into a single gesture definition. For example, in FIG. 2, a hand points at an object; gesture interpreter controller 404 may detect that the hand object is pointing and detect what the hand is pointing at, to determine whether the pointing indicates a request, an identification, or other type of gesture.

In another embodiment, gesture interpreter controller 404 maps multiple aggregated tracked objects into multiple gesture definitions. For example, a person may simultaneously communicate through facial gesture and a hand gesture, where in predicting the actual gestures communicated through the tracked movement of the facial gesture and hand gesture, gesture interpreter 404 analyzes the 3D object properties of the facial gesture in correlation with the 3D object properties of the hand gesture and accesses gesture definitions to enable prediction of each of the gestures in relation to one another.

In the example, gesture interpreter controller 404 accesses gesture definitions from a gesture database 410, which includes general gesture action definitions 412, context specific gesture definitions 414, application specific gesture definitions 416, and user specific gesture definitions 418. It will be understood that gesture database 410 may include additional or alternate types of gesture definitions. In addition, it is important to note that each of the groupings of gesture definitions illustrated in the example may reside in a single database or may be accessed from multiple database and data storage systems via a network.

General gesture action definitions 412 include gesture definitions for common gestures. For example, general gesture action definitions 412 may include gesture definitions for common gestures, such as a person pointing, a person waving, a person nodding "yes" or shaking one's head "no", or other types of common gestures that a user makes independent of the type of communication or context of the communication.

Context specific gesture definitions 414 include gesture definitions specific to the context in which the gesture is being detected. Examples of contexts may include, but are not limited to, the current location of a gesturing person, the time of day, the languages spoken by the user, and other factors that influence the context in which gesturing could be interpreted. The current location of a gesturing person might include the country or region in which the user is located and might include the actual venue from which the person is speaking, whether the person is in a business meeting room, in an office, at home, or in the car, for example. Gesture interpreter controller 404 may detect current context from accessing an electronic calendar for a person to detect a person's scheduled location and additional context information about that location, from accessing a GPS indicator of a person's location, from performing speech analysis of the person's speech to detect the type of language, from detecting objects within the image data indicative of particular types of locations, or from receiving additional data from other systems monitoring the context in which a user is speaking.

Application specific gesture definitions 416 include gesture definitions specific to the application to which the predicted gesture will be sent. For example, if gesture interpreter controller 404 will transmit the predicted gesture to an instant messaging service provider, then gesture interpreter controller 404 selects gesture definitions associated with instant messaging communication from application specific gesture definitions 416. In another example, if gesture interpreter controller 404 is set to transmit the predicted gesture to a mobile user, then gesture interpreter controller 404 selects gesture definitions associated with an application that supports communications to a mobile user from application specific gesture definitions 416.

User specific gesture definitions 418 include gesture definitions specific to the user making the gestures. In particular, gesture interpreter controller 404 may access an identifier for a user from the user logging in to use an electronic communication, from matching a biometric entry by the user with a database of biometric identifiers, from the user speaking an identifier, or from other types of identity detection.

Further, within the available gesture definitions, at least one gesture definition may be associated with a particular area of movement or a particular depth of movement. The three-dimensional focus area in which movement is detected may be divided into three-dimensional portions, where movements made in each of the portions may be interpreted under different selections of gesture definitions. For example, one three-dimensional portion of a focus area may be considered an "active region" where movement detected within the area is compared with a selection of gesture definitions associated with that particular active region, such as a region in which a user makes virtual selections.

As will be further described with reference to FIG. 11, the gesture definitions included within gesture database 410 may be added to or adjusted based on user feedback. For example, gesture database 410 may learn additional gesture definitions and adjust the parameters of already learned gesture definitions through user feedback, in a similar manner as a speech recognition system is trained, to more accurately map and predict gestures in general, within different context, specific to applications, and specific to particular users.

Gesture interpreter controller 404 may output predicted gesture output 108 in the form of one or more gesture records, such as gesture record 420. Gesture record 402 indicates the "gesture type" and "probability %" indicative of the certainty that the detected movement is the predicted gesture type. In addition, gesture record 420 includes the start X, Y, and Z axis properties and ending X, Y, and Z axis properties of the gesture, listed as "start_x_pos", "end_x_pos", "start_y_pos", "end_y_pos", "start_z_pos", "end_z_pos". Although not depicted, dependent upon the gesture-enabled application to which gesture record 420 will be sent, gesture interpreter controller 404 may include additional types of information in each gesture record, including, but not limited to a user identifier of the gesturing user, a relative location of the object in comparison to other objects or in comparison to the detected focus area, and other information detectable by gesture interpreter controller 404.

Figure 5:
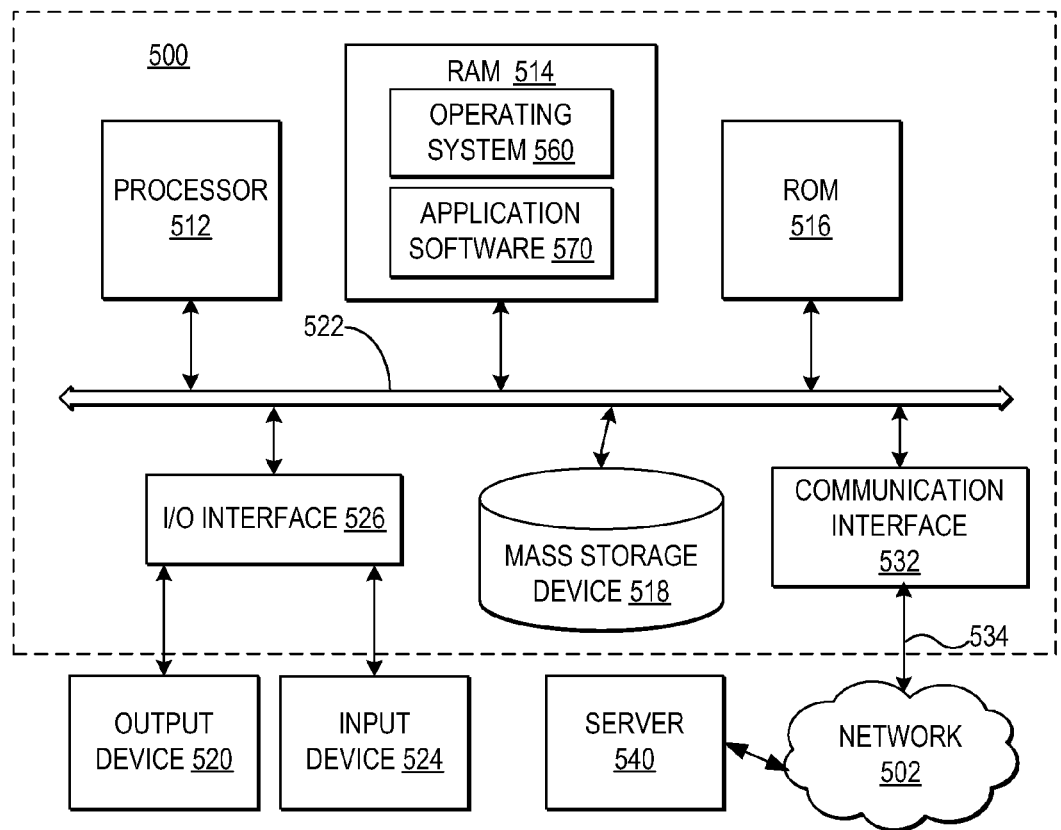
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D object detection from captured images and data, gesture prediction from the detected 3D objects, and output of the predicted gesture by a gesture-enabled application, as depicted in the operations of flowcharts of FIGS. 12-16 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 500 to perform a process according to the present invention. The term "machine-readable medium" as used herein includes any medium that participates in providing instructions to processor 512 or other components of computer system 500 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the program instructions may be transferred from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements is, a processing task distributed among the processor elements, whether locally or via a network, may represent a consumer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
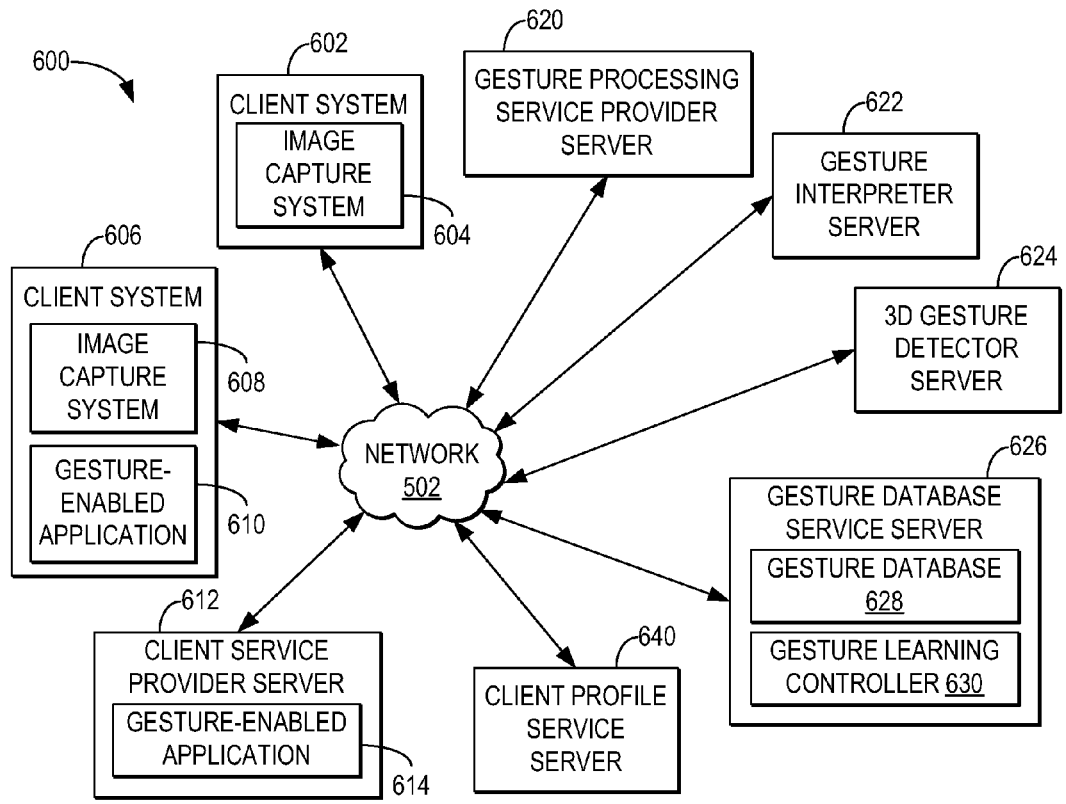
FIG. 6 is a block diagram depicting one example of a distributed network environment in which the gesture processing method, system, and program may be implemented.

Referring now to FIG. 6, a block diagram depicts one example of a distributed network environment in which the gesture processing method, system, and program may be implemented. It is important to note that distributed network environment 600 is illustrative of one type of network environment in which the gesture processing method, system, and program may be implemented, however, the gesture processing method, system, and program may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a gesture processing system. It will be understood that other types of systems and services and other groupings of systems and services in a network environment may implement the gesture processing system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a gesture processing system; however other network configurations and network components may be implemented for supporting and implementing the gesture processing system of the present invention.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with a stereoscopic image capture system 604 and a client system 606 with a stereoscopic image capture system 608. In one example, stereoscopic image capture systems 604 and 608 include multiple image capture devices, such as image capture devices 302 and 304, and may include one or more sensors, such as sensor 306. Stereoscope image capture systems 604 and 608 capture images and other data and stream the images and other data to other systems via network 502 for processing. In addition, stereoscope image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and 606 may stream captured image frames to one or more gesture detection services. In one example, a gesture processing service provider server 620 provides a service that includes both a gesture detector service for processing streamed images and other data and a gesture interpreter service for predicting a gesture and controlling output of the predicted gesture to one or more other systems accessible via network 502.

As to gesture processing service provider server 620, different entities may implement a gesture processing service and different entities may access the gesture processing service. In one example, a user logged into one of client systems 602 or 606 may subscribe to the gesture processing service. In another example, an image capture system or a particular application requesting gesture processing may automatically stream captured images and data to the gesture processing service. In yet another example, a business may implement the gesture processing service in a communications network.

In another example, each of client system 602 and client system 606 may stream captured frames to a 3D gesture detector server 624. 3D gesture detector server 624 receives captured images and other data from image capture systems, such as stereoscopic image capture system 604 or stereoscopic image capture system 608, and processes the images and other data to generate 3D properties of detected objects, for output to a gesture interpreter system, such as gesture interpreter server 622 or gesture processing service provider server 620. In additional or alternate embodiments, a gesture detector service may be implemented within one or more other systems, with one or more other services performed within those systems. In particular, in additional or alternate embodiments, a gesture detector service may be implemented within a client system at which the images and other data are captured.

In particular to gesture interpreter server 622 and 3D gesture detection server 624, each of these servers may be distributed across one or more systems. In particular, each of gesture interpreter server 622 and 3D gesture detection server 624 are distributed across systems with 3D image processing power, including processors with the CellBE architecture programmed to perform efficient 3D data processing. In one example, an entity, such as a business or service provider, may implement separate server systems for gesture detection and gesture interpretation, wherein multiple gesture interpreter servers are implemented with each gesture interpreter server processing different types of 3D properties.

Gesture processing service provider server 620, gesture interpreter server 622, and 3D gesture detection server 624 may locally store a gesture database, such as gesture database 110, of raw images, 3D object properties, and gesture definitions. In addition, gesture processing service provider server 620, gesture interpreter server 622 and 3D gesture detection server 624 may access a gesture database service server 626 that facilitates a gesture database 628. Gesture database 628 may include, but is not limited to, raw images and data, 3D object properties, gesture definitions, and gesture predictions.

In addition, gesture database service server 626 includes a gesture learning controller 630. Gesture learning controller 630 prompts users to provide samples of particular types of gestures and prompts users to indicate whether a predicted gesture matches the user's intended gesture. In addition, gesture learning controller 630 gathers other information that enables gesture learning controller 630 to learn and maintain gesture information in gesture database 628 that when accessed by gesture detection services and gesture interpreter services, increases the accuracy of generation of 3D object properties and accuracy of prediction of gestures by these services. In one example, gesture database server 626 provides a gesture signature service, wherein gesture learning controller 630 learns a first set of gestures for the user and continues to monitor and learn additional gestures by monitoring the user participation in electronic communications, to provide a single storage system to which a user may direct other services to access gesture definitions associated with the user.

Further, gesture processing service provider server 620, gesture interpreter server 622, 3D gesture detector server 624 or gesture database service server 626 may access additional context information about a person making a gesture from a client profile service server 640. In one example, context information may be used to select gesture definitions associated with the context. In particular, context information accessed for a particular user identifier from client profile service server 640 may enable a determination of context factors such as the current location of a person, the current physical environment in which the person is located, the events currently scheduled for a person, and other indicators of the reasons, scope, purpose, and characteristics of a person's interactions.

In one example, client profile service provider 640 monitors a user's electronic calendar, a user's current GPS location, the environment surrounding a GPS location from a user's personal, portable telephony device. In another example, client profile service provider 640 stores network accessible locations from which client profile service server 640 may access current user information upon request. In a further example, client profile service provider 640 may prompt a user to provide current interaction information and provide the user's responses to requesting services.

Gesture processing service provider server 620 and gesture interpreter server 622 stream 3D predicted gestures to gesture-enabled applications via network 502. A gesture-enabled application may represent any application enabled to receive and process predicted gesture inputs.

In the example embodiment, client system 606 includes a gesture-enabled application 610. Gesture-enabled application 610 at client system 606 may receive predicted gestures for gestures made by the user using client system 606, as captured by stereoscopic image capture system 608, or may receive predicted gestures made by other users, as detected by stereoscopic image capture system 608 or other image capture systems.

In one example, gesture-enabled application 610 may represent a gesture-enabled communications application that facilitates electronic communications by a user at client system 606 with other users at other client systems or with a server system. Gesture-enabled application 610 may receive predicted gestures made by the user at client system 606 and prompt the user to indicate whether the detected predicted gesture is correct. If the user indicates the predicted gesture is accurate, gesture-enabled application 610 inserts a representation of the gesture in the facilitated electronic communication session. If gesture-enabled application 610 is supporting multiple concurrent electronic communications sessions, gesture-enabled application 610 may request that the user indicate in which communication session or communication sessions the gesture indication should be inserted.

In addition, in the example embodiment, client service provider server 612 includes a gesture-enabled application 614. Client service provider server 612 represents a server that provides a service to one or more client systems. Services may include providing internet service, communication service, financial service, or other network accessible service. Gesture-enabled application 614 receives predicted gestures from a user at a client system or from a gesture interpreter service, such as gesture processing service provider server 620 or gesture interpreter server 622, and enables the service provided by client service provider server 612 to process and apply the predicted gestures as inputs.

In one example, client service provider server 612 provides an electronic communication service to multiple users for facilitating electronic communication sessions between selections of users. Gesture-enabled application 614 represents a gesture-enabled communication service application that receives predicted gestures, converts the predicted gesture record into an object insertable into a communication session, and inserts the predicted gestures into a particular communication session facilitated by the electronic communication service of client service provider server 612.

Figure 7:
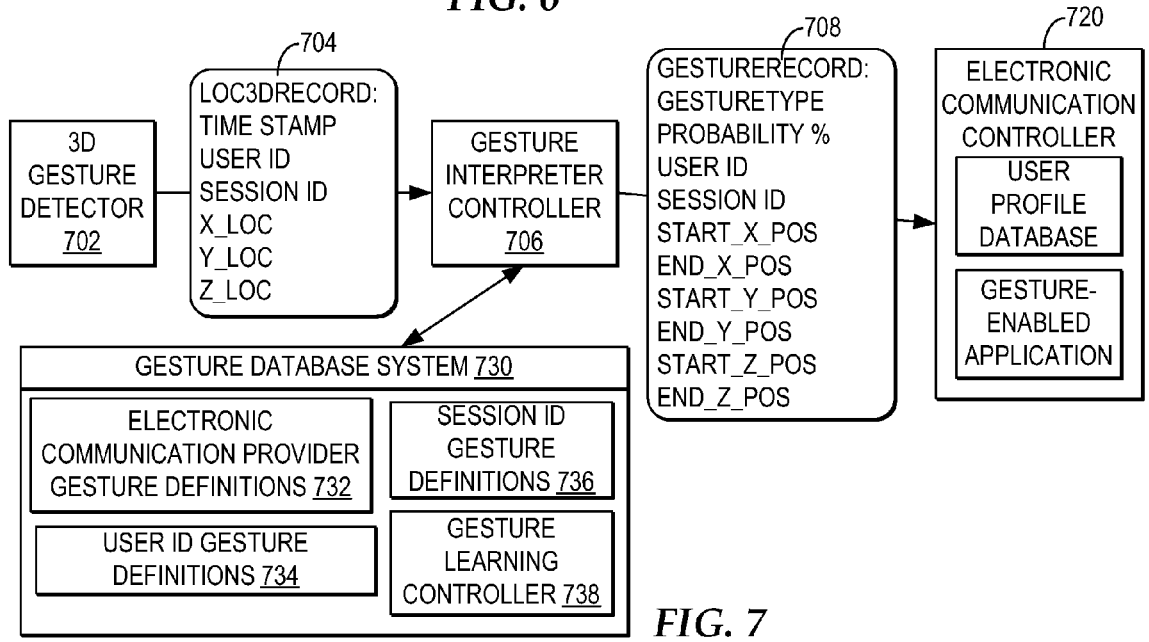
FIG. 7 is a block diagram illustrating one example of an implementation of a gesture interpreter system communicating with a gesture-enabled electronic communication controller.

With reference now to FIG. 7, a block diagram illustrates one example of an implementation of a gesture interpreter system communicating with a gesture-enabled electronic communication controller. In the example, an electronic communication controller 720 facilitates an electronic communication session between two or more participants via a network. In an audio or text based communication session, there is not a line of sight between the participants, so each of the participants cannot view or interpret non-verbal communication, such as gestures, made by the other participants. In addition, even in a video based communication, participants may view single video streams of captured images of the other participants; however, a 2D video stream does not provide full visibility, in three dimensions, of the non-verbal gesturing of other participants.

In the example, a 3D gesture detector 702 detects a session ID for a particular communication session facilitated by electronic communication controller 720 and a user ID for a user's image captured in association with the session ID. In one example, 3D gesture detector 702 detects user ID and session ID from electronic communication controller 720. In particular, although not depicted, captured images may be first streamed to electronic communication controller 720, where electronic communication controller 720 attaches a user ID and session ID to each image frame and passes the image frames to 3D gesture detector 702. In another example, 3D gesture detector 702 receives user ID and session ID attached to the stream of captured images from stereoscopic image capture devices, where a client application running at a client system at which the user is logged in and participating in the session attaches the user ID and session ID in association with the stream of captured images. In addition, it will be understood that 3D gesture detector 702 may access a user ID and session ID associated with a particular selection of captured images from other monitoring and management tools.

In particular, in the example, each 3D object properties record streamed by 3D gesture detector 702, such as 3D object position properties 704, includes a user ID and a session ID. In another example, a 3D object properties record may include multiple session IDs if a user is participating in multiple separate electronic communication sessions.

In addition, as gesture interpreter controller 706 predicts gestures for the 3D object properties, the user ID and session ID stay with the record. For example, a predicted gesture record 708 includes the user ID and session ID. By maintaining the user ID and session ID with the record, when gesture interpreter controller 706 passes the predicted gesture to electronic communication controller 720, the predicted gesture is marked with the user ID and session ID to which the predicted gesture is applicable.

Electronic communication 720 may simultaneously facilitate multiple communication sessions between multiple different sets of users. By receiving predicted gestures with a user ID and session ID, electronic communication controller 720 is enabled to easily match the gesture with the communication session and with a user participating in the communication session. In addition, by including a time stamp with the predicted gesture record, electronic communication controller 720 may align the predicted gesture into the point in conversation at which the user gestured.

In addition, in the example, as a 3D gesture detector 702 detects and generates 3D object properties and gesture interpreter controller 706 predicts gestures for the 3D object properties, each of 3D gesture detector 702 and gesture interpreter controller 706 accesses a gesture database system 730. Gesture database system 730 includes databases of object mapping and gesture definitions specified for electronic communication controller 720, as previously described with reference to gesture database 410 of FIG. 4 and gesture database service server 626 of FIG. 6.

In particular, within the implementation of predicting gestures made during an electronic communication session, gesture database system 730 provides access to electronic communication provider gesture definitions 732, where electronic communication provider gesture definitions 732 are specified for the type of electronic communication supported by electronic communication controller 720. In one example, gesture database system 730 accesses electronic communication provider gesture definitions 732 or types of gestures to include in electronic communication provider gesture definitions 732 from electronic communication controller 720. In another example, gesture learning controller 738 monitors gesture based communications facilitated by electronic communication controller 720, determines common gesturing, and generates gesture definitions for common gesturing associated with communications facilitated by electronic communication controller.

In another example, gesture database system 730 detects the user ID in the frame record and accesses a database of gesture definitions learned by gesture learning controller 738 for the particular user ID, as illustrated by user ID gesture definitions 734. In one example, gesture database system 730 may lookup user ID gesture definitions 734 from electronic communication controller 720. In another example, gesture database system 730 may lookup gesture definitions for the user ID from a gesture signature service, such as from gesture database server 626 in FIG. 6, which includes gesture definitions for a particular user. In yet another example, gesture learning controller may monitor gesturing in association with the user ID in communications facilitated by electronic communication controller 720, determine common gesturing, and generate gesture definitions for common gesturing.

In yet another example, gesture database system 730 detects the session ID, monitors the gestures predicted during the ongoing session, monitors user responses to the gestures, and creates additional gesture definitions for gestures common to the session as the session is ongoing in session ID gesture definitions 736. By creating a database of common gestures for the session, gesture database system 730 generates gesture definitions for those gestures with a higher probability of being repeated during the session. In addition, gesture database system 730 may store the generated gesture definitions according to the user IDs of the participants and upon detection of a subsequent session including one or more of the same user IDs, include the commonly detected gestures in the current session ID gesture definitions.

Figure 8:
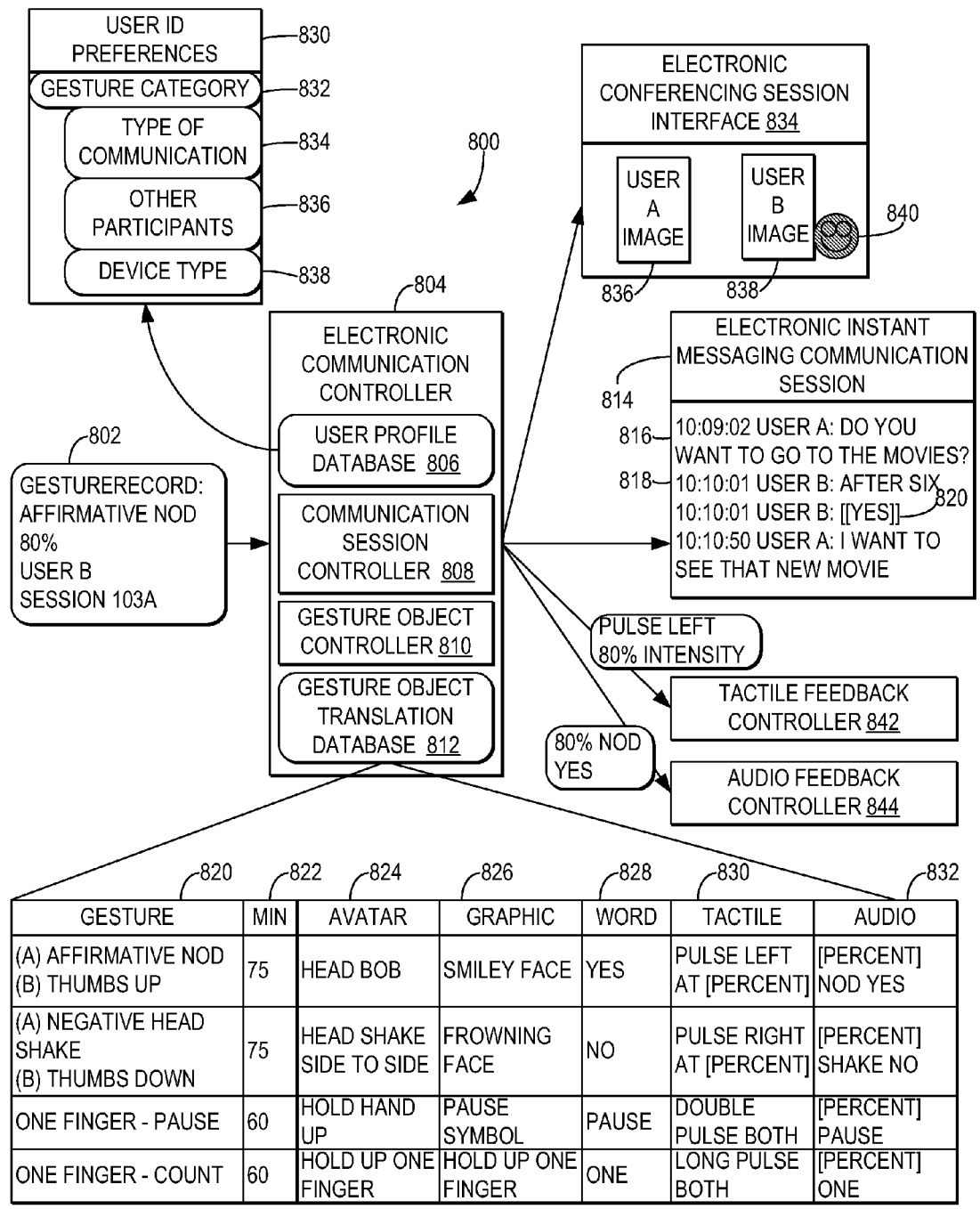
FIG. 8 is a block diagram depicting one example of a gestured enabled electronic communication service for controlling output of predicted gestures in association with electronic communication sessions.

Referring now to FIG. 8, a block diagram illustrates one example of a gestured enabled electronic communication service for controlling output of predicted gestures in association with electronic communication sessions. As illustrated, an electronic communication controller 804 includes a user profile database 806 and a communication session controller 808 for controlling one or more types of communication sessions between one or more selections of users with user identifiers (IDs) assigned in user profile database 806. In particular, communication session controller 808 may provide a service for controlling one or more types of communication sessions including, but not limited to, a telephony communication, an audio conferencing communication, a video conferencing communication, a collaborative browsing communication, a text messaging based communication, an instant messaging based communication, and other types of communications supported via a network, such as network 502.

In addition, electronic communication controller 804 is gesture-enabled through a gesture object controller 810. Gesture object controller 810 detects predicted gesture inputs to electronic communication controller 804. For example, gesture object controller 810 detects predicted gesture input 802 of "affirmative nod" with a percentage certainty of 80%.

Gesture object controller 810 receives predicted gesture inputs and determines a translation for the predicted gesture into an output object in a communication session. In the example, gesture object controller 810 accesses a gesture object translation database 812 to translate predicted gesture inputs into one or more categories of output objects in association with a communication session.

In one example, gesture object translation database 812 includes a first element of the predicted gesture, as illustrated at reference numeral 820. As illustrated, multiple predicted gestures may be grouped together, such as the grouping of "affirmative node" and "thumb up", the grouping of "negative head shake" and "thumb down". In addition, as illustrated, preference may be set for a single predicted gesture, such as "one finger—pause" and "one finger—count".

In addition, for each predicted gesture, gesture object translation database 812 includes a minimum prediction percentage as illustrated at reference numeral 822. For example, for the first and second groupings, the minimum prediction percentage is 75%, but for the predicted gesture of "one finger—pause" and "one finger—count", the percentage certainty is 60%. By setting a minimum prediction percentage threshold, if the percentage certainty for a predicted gesture received by gesture object controller 810 does not meet the minimum prediction percentage threshold, gesture object controller 810 triggers a communication to the user associated with the predicted gesture to request that the user indicate whether the gesture is accurate.

Further, for each predicted gesture, gesture object translation database 812 includes multiple types of output objects, in different categories. In the example, the categories of output objects, includes an avatar output, as illustrated at reference numeral 824, a graphical output, as illustrated at reference numeral 826, a word output, as illustrated at reference numeral 828, a tactile feedback output, as illustrated at reference numeral 830, and an audio output, as illustrated at reference numeral 832. In the example, for the grouping of "affirmative nod" and "thumb up" the avatar object output is a control to "bob head", the graphical object output is a graphical "smiley face", the word object output is "yes", the tactile feedback object output is a "pulse left" of an intensity based on the percentage certainty, and the audio object output is a voice speaking "[percentage] nod yes". In addition, in the example, for the grouping of "negative head shake" and "thumb down", the avatar object output is a control to "head shake side to side", the graphical object output is a "frowning face", the word object output is "no", the tactile feedback object output is a "pulse right" of an intensity based on the percentage certainty, and the audio object output is a voice speaking "[percentage] shake no". Further, in the example, for the "one finger—pause" gesture, the avatar object output is a "hold hand in stop position", the graphical object output is a "pause symbol", the word object output is "pause", the tactile feedback object output is a "double pulse both" for both right and left, and the audio object output is a voice speaking "[percentage] pause". In the example, for the "one-finger—count" gesture, the avatar object output is a "hold up one finger", the graphical object output is a graphical "1", the word object output is "one", the tactile feedback object output is a "long pulse both", and the audio object output is a voice speaking "[percentage] one". It will be understood that the examples of the categories of output objects and types of output objects based on categories may vary based on user preferences, output interfaces available, available objects, and other variables.

In the example, user profile database 806 includes preferences for each userID of how to select to include gesture objects into communication sessions. In the example, for each userID 830, a user may set multiple preferences for output of gesture objects according to a particular category of gesture object output, as illustrated at reference numeral 832. In particular, the user may specify preferences for categories of gesture object output based on the type of communication session, as illustrated at reference numeral 834, the other participants in the communication session, as depicted at reference numeral 836, the device used for the communication session, as illustrated at reference numeral 838. In additional or alternate embodiments, user preferences may include additional or alternate types of preferences as to which category of gesture object to apply including, but not limited to, a particular time period, scheduled event as detected in an electronic calendar, a location, or other detectable factors. Further, a user may specify a preference to adjust the category selection based on whether another user is talking when the gesture object will be output, such that a non-audio based category is selected if other audio is output in the communication session.

For purposes of illustration, electronic communication controller 804 receives predicted gesture 802 of an "affirmative nod" with a probability percentage of 80% and with a particular user ID of "userB", a session ID of "103A", and a timestamp of "10:10:01". Gesture object controller 810 determines from gesture object translation database 812 that the percentage certainty of "80%" is sufficient to add to the communication. In the example, multiple types of output are selected to illustrate output of different gesture object categories.

In one example, "user A" and "user B" are participating in an instant messaging electronic communication session controlled by communication session controller 808 and illustrated in electronic communication session interface 814. Gesture object controller 810 selects to insert the word object associated with "affirmative nod" of "yes". Gesture object controller 810 directs communication session controller to include the word object of "yes" within session ID "103A" at the time stamp of "10:10:01". In the example, within electronic communication session interface 814 of session ID "103A" a first text entry is made by "user A", as illustrated at reference numeral 816. A next text entry illustrated at reference numeral 818 includes a text entry made by "user B". In addition, a next entry illustrated at reference numeral 820 is attributed to "user B" and includes the word object of "yes", identified between double brackets, at a time stamp of "10:10:01". In the example, the gesture entry by "user B" is inserted in the message entries in order of timestamp. In another example, where text or voice entries may arrive at electronic communication controller before a gesture made at the same time as the text or voice entry, gesture entries may be added in the order of receipt, instead of order of timestamp.

In another example, "user A" and "user B" are participating in an electronic conference session controlled by communication session controller 808, where each user is represented graphically or within a video image in a separate window at each of the other user's systems. For example, each user may view an electronic conferencing interface 834 with a video image 836 of "user A" and a video image 838 of "user B". Gesture object controller 810 directs communication session controller to add a graphical "smiley face", shaded 80%, as illustrated at reference numeral 840, where the graphical "smiley face" is displayed in correspondence with video image 838 of "user B".

In a further example, regardless of the type of electronic communication session facilitated by communication session controller 808, gesture object controller 810 selects the tactile feedback output category, which specifies "pulse left" of an intensity based on the percentage certainty. Gesture object controller 810 directs a tactile feedback controller 842 to control output of a pulse on the left of an intensity of 80% of the potential pulse intensity. As will be further described with reference to FIG. 10, a user may wear tactile feedback devices, controlled by a tactile feedback controller, to pulse or create other types of feedback that can be sensed through touch. Other types of tactile feedback devices may include, for example, a Braille touch pad that outputs tactile detectable characters. Further, a tactile feedback device may include a telephony device with a vibrating feature that can be controlled by gesture object controller 810 to vibrate in recognizable tactile detectable patterns. In addition, it is important to note that gesture object controller 810 may direct communication session controller 810 to control output to tactile feedback controller 842 as part of a communication session facilitated by communications session controller 808.

In yet another example, regardless of the type of electronic communication session facilitated by communication session controller 808, gesture object controller 810 selects the audio output category, which specifies a voice output of "[percentage] nod yes". Gesture object controller 810 directs an audio feedback controller 844 to convert from text to voice "80% nod yes" and to output the phrase to an audio output interface available to the user, such as headphones. In addition, it is important to note that gesture object controller 810 may direct communication session controller 810 to control output to audio feedback controller 844 within a voice based communication session facilitated by communications session controller 808.

It is important to note that since the gesture processing system predicts gestures with a particular percentage certainty, incorporating the percentage certainty into a communication of a predicted non-verbal communication provides the receiver with an understanding of the certainty to which a receiver can rely on the gesture interpretation. In the examples depicted in FIG. 8, for example, a user is alerted to the percentage certainty in the predicted gesture by shading at reference numeral 840, by an intensity of a pulse output by tactile feedback controller 842, and by an audio message including the percentage certainty output by audio feedback controller 844. Additional indicators may include adjusting the output of audio feedback to indicate the percentage certainty, inserting text into messages to indicate the percentage certainty, and other audio, graphical, and textual adjustments to an output interface to indicate the predicted accuracy of a gesture object output. For example, to indicate predicted accuracy in a graphical gesture output object, such as an icon representing the gesture, the percentage certainty may be conveyed by adjusting one or more of the transparency, color, tone, size, or font for an icon. Gesture object controller 810 may adjust a smiley face icon with a percentage certainty of 50% to 50% transparency and a yellow color and adjust a smiley face icon with a percentage certainty of 75% to 25% transparency and a green color, where colors range from least certainty to most certainty from red to yellow to green.

Figure 9:
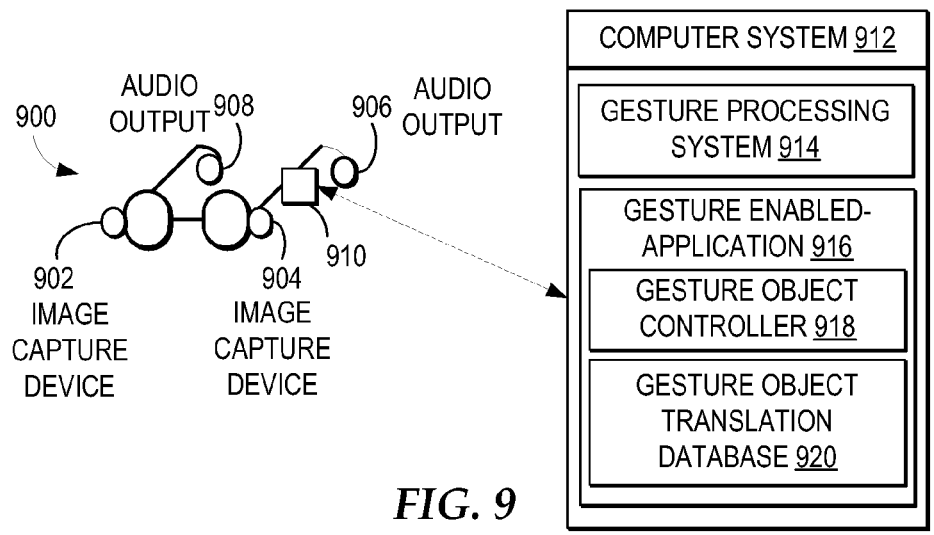
FIG. 9 is a block diagram illustrating one example of a gesture detection interface and gesture object output interface.

With reference now to FIG. 9, a block diagram illustrates one example of a gesture detection interface and gesture object output interface. In the example, FIG. 9 includes a headpiece 900, which is a wearable apparatus. A person, animal, or other movable entity may wear headpiece 900. In the example, headpiece 900 is a pair of glasses, however, in an additional or alternate embodiment, headpiece 900 may represent other types of wearable apparatus.

In the example, an image capture device 902 and an image capture device 904 are each affixed to headpiece 900. Each of image capture device 902 and image capture device 904 capture video image streams and other types of sensed data. Each of image capture devices 902 and image capture device 904 may transmit images and data to a computer system 912 implementing a gesture processing system 914 through a wired connection or through transmissions by a wireless transmitter 910 affixed to headpiece 900.

In one example, computer system 912 is a local, mobile computing system, such as computer system 500, carried or worn by the user wearing headpiece 900. For example, computer system 912 as a local, mobile computing system may be implemented in, for example, a hip belt attached computing system, a wireless telephony device, or a laptop computing system. In another example, computer system 912 remains in a fixed position, but receives wireless transmissions from wireless transmitter 910 or other wireless transmitters within the broadcast reception range of a receiver associated with computer system 912.

Gesture processing system 914 may run within computer system 912 or may interface with other computing systems providing gesture processing services to process captured images and data and return a predicted gesture from the captured images and data. In particular, computer system 912 may include a wired or wireless network interface through which computer system 912 interfaces with other computing systems via network 502.

In one example, image capture device 902 and image capture device 904 are positioned on headpiece 900 to capture the movement of a user's nose in comparison with the user's environment, in three dimensions, to more accurately predict gestures associated with the user's head movement. Thus, instead of capturing a video image of the user from the front and detecting gesturing made with different body parts, image capture device 902 and image capture device 904 capture only a particular perspective of movement by the user, but in three dimensions, and gesture processing system 914 could more efficiently process images and predict gestures limited to a particular perspective. In another example, image capture device 902 and image capture device 904 may be positioned on headpiece 900 to capture the movement of a user's hands or other isolated areas of movement in comparison with the user's environment.

In another example, image capture device 902 and image capture device 904 are positioned to capture images in front of the user. Thus, image capture device 902 and image capture device 904 detect gestures made by the user within the scope of the image capture devices and also detect all the gestures made by others in front of the user. For a user with vision impairment, by detecting the images in front of the user, the user may receive feedback from gesture processing system 914 indicating the gestures and other non-verbal communication visible in front of the user. In addition, for a user with vision impairment, the user may train gesture processing system 914 to detect particular types of objects and particular types of gesturing that would be most helpful to the user. For example, a user may train gesture processing system 914 to recognize particular people and to recognize the gestures made by those particular people. In addition, a user may train gesture processing system 914 to recognize animals and to recognize the gesture made by animals indicative of whether or not the animal is friendly, such as a wagging tail.

In yet another example, one or more of image capture device 902 and image capture device 904 are positioned to capture images outside the viewable area of the user, such as the area behind the user's head or the area in front of a user when the user is looking down. Thus, image capture device 902 and image capture device 904 are positioned to detect gestures out of the line of sight of the user and gesture processing system 914 may be trained to detect particular types of objects or movements out of the user's line of sight that the user indicates a preference to receive notification of. For example, in a teaching environment where the speaker often turns one's back or loses the view of the entire audience, the speaker trains gesture processing system 914 to detect particular types of gestures that indicate whether an audience member is paying attention, is confused, is waiting to ask a question by raising a hand, or other types of gesturing detectable during a lecture and of importance to the speaker.

In addition, in the example, an audio output device 906 and an audio output device 908 are affixed to headpiece 900 and positioned as earpieces for output of audio in a user's ears. Each of audio output device 906 and audio output device 908 may receive audio transmission for output from computer system 912 via a wired connection or from wireless transmitter 910. In particular, a gesture-enabled application 916 includes a gesture object controller 918 and a gesture object translation database 920, as similarly described with reference to FIG. 8. Upon receipt of a predicted gesture from gesture processing system 914 or other gesture processing system via a network communication, gesture object controller 918 determines, from gesture object translation database 920, the category of output for translating the predicted gesture into output detectable by the user and gesture object controller 918 controls output of the selected gesture object. In particular, gesture object translation database 920 may include translations of predicted gestures into audio output based gesture objects, such that gesture object controller 918 controls audio output of gesture objects to audio output device 906 and audio output device 908.

In one example, image capture device 902 and image capture device 904 capture gestures by a person talking to the user, gesture processing system 914 receives the captured images and predicts a gesture of "nodding" with 80% certainty, image processing system 914 passes the predicted gesture of "nodding" with percentage certainty to gesture-enabled application 916, gesture-enabled application 916 translates the predicted gesture and percentage into an audio output object of "80% likely nodding yes", and gesture-enabled application 916 controls output of the translated audio to audio output device 906 and audio output device 908.

In another example, image capture device 902 and image capture device 904 capture gestures by multiple persons behind the user. Gesture processing system 914 receives the captured images and for each person and detects an identity of each person using one of voice recognition, facial recognition, or other biometric information and accesses a name or nickname associated with the identified person. In addition, gesture processing system 914 detects a relative position of that person and predicts gestures made by that person, such as "John in left quarter" gives a predicted gesture of "thumbs up" with 90% certainty. Gesture processing system 914 passes the predicted gesture, certainty, and position of the person to gesture-enabled application 916, gesture-enabled application 916 translates the predicted gesture, percentage certainty, and position into an audio output object of "90% likely thumb up by person behind you to the right", and gesture-enabled application 916 controls output of the translated audio to audio output device 906 and audio output device 908.

In addition, gesture-enabled application 916 may control output of predicted gestures to other output interfaces. For example, although not depicted, the glasses of headpiece 900 may include a graphical output interface detectable within the glasses or projected from the glasses in three dimensions. Gesture-enabled application 916 may translate predicted gestures into graphical objects output within the glasses output interface.

It is important to note that while in the example, image capture device 902, image capture device 904, audio output device 906, and audio output device 908 are affixed to a same headpiece 900, in alternate embodiments, the image capture devices may be affixed to a separate headpiece from the audio output devices. In addition, it is important to note that while in the example, computer system 912 includes both gesture processing system 914 and gesture-enabled application 916, in an alternate embodiment, different computing systems may implement each of gesture processing system 914 and gesture-enabled application 916.

In addition, it is important to note that multiple people may each wear a separate headpiece, where the images captured by the image capture devices on each headpiece are transmitted to a same computer system, such as computer system 912, via a wireless or wired network connection. By gathering collaborative images and data from multiple people, gesture processing system 914 may more accurately detect objects representative of gestures and predict a gesture from detected moving objects.

Further, it is important to note that multiple local mobile computer systems, each gathering images and data from image capture devices and sensors affixed to a headpiece may communicate with one another via a wireless or wired network connection and share gathered images, data, detected objects, and predicted gestures. In one example a group of users within a local wireless network broadcast area may agree to communicatively connect to one another's portable computer devices and share images and data between the devices, such that a gesture processing system accessible to each device may more accurately predict gestures from the collaborative images and data.

In either example, where collaborative images and data are gathered at a single system or shared among multiple systems, additional information may be added to or extracted from the images and data to facilitate the placement of different sets of captured images and data relative to other sets of captured images and data. For example, images and data transmitted for collaboration may include location indicators and orientation indicators, such that each set of images and data can be aligned and orientated to the other sets of images and data.

Figure 10:
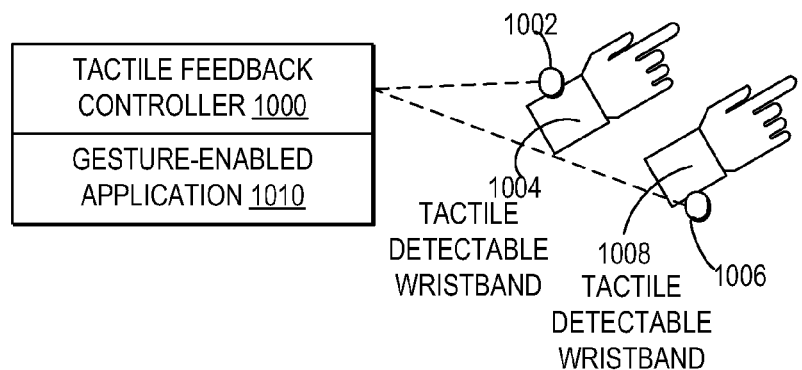
FIG. 10 is an illustrative diagram depicting one example of tactile detectable feedback devices for indicating a gesture object output.

Referring now to FIG. 10, an illustrative diagram illustrates one example of tactile detectable feedback devices for indicating a gesture object output. As illustrated, a person may wear wristbands 1004 and 1008, which each include controllers for controlling tactile detectable outputs and hardware which can be controlled to create the tactile detectable outputs. Examples of tactile detectable outputs may include detectable pulsing, detectable changes in the surface of the wristbands, and other adjustments that can be sensed by the user wearing wristbands 1004 and 1008. In addition, tactile detectable outputs may be adjusted in frequency, intensity, duration, and other characteristics that can be sensed by the user wearing wristbands 1004 and 1008.

In the example, wristband 1004 includes a wireless transmitter 1002 and wristband 1008 includes a wireless transmitter 1006. Each of wireless transmitter 1002 and wireless transmitter 1006 communicate via a wireless network transmission to a tactile feedback controller 1000. Tactile feedback controller 1000 receives tactile signals from a gesture-enabled application 1010 and transmits signals to each of wireless transmitters 1002 and 1006 to direct tactile output from wristbands 1004 and 1008.

Gesture-enabled application 1010 detects a predicted gesture by a gesture processing system and translates the predicted gesture into a gesture output object. In particular, gesture-enabled application 1010 may translate a predicted gesture into a tactile feedback output, as illustrated in FIG. 8 with reference to the tactile feedback category illustrated at reference numeral 830 within gesture object translation database 822.

In particular, in translating predicted gestures into tactile feedback output, gesture-enabled application 1010 may translate a gesture into feedback at one or both of wristbands 1004 and 1008, with a particular intensity of feedback, with a particular pattern of output. In particular, a person can quickly learn that a pulse on the right wrist means "yes" and a pulse on the left wrist means "no", however, a person may not be able to remember a different tactile feedback output for every possible type of gesture. Thus, a user may limit, via gesture-enabled application 1010, the types of predicted gestures output via tactile feedback to a limited number of gestures translated into types of tactile feedback output that can be remembered by the user. In addition, the user may teach gesture-enabled application 1010 the types of tactile feedback that the user can detect and readily remember and the user may specify which types of tactile feedback to associate with particular predicted gestures.

In the example, tactile feedback controller 1000 and gesture-enabled application 1010 are enabled on a computer system 1020, which may be a local, mobile computer system, such as computer system 912 of FIG. 9. In addition, tactile feedback controller 1000 and gesture-enabled application 1010 may be distributed across multiple computer systems communicative via a network connection.

In particular, for a user whose vision is impaired in some way or a user without a direct line of sight to a speaker, providing tactile feedback outputs indicative of the gestures made around the user or by others communicating with the user, requires translating non-verbal gesturing into a non-verbal communication detectable by the user. It is important to note, however, that wristbands 1004 and 1008 are examples of one type of tactile feedback devices located in two fixed positions; in alternate embodiments, other types of tactile feedback devices may be implemented, one or more tactile devices may be implemented, and tactile devices may be detectable in one or more locations. For example, many telephony devices already include a vibration feature that gesture-enabled application 1010 may control by sending signals to control vibrations representative of predicted gestures. In another example, a user may wear a tactile detectable glove that functions as a Braille device with tactile adjustable interfaces in the fingertips of the glove.

It is important to note that a user may wear both headpiece 900 and tactile detectable wristbands 1004 and 1008. In this example, gesture-enabled application 916 would control output to either or both of tactile feedback controller 1000 and wireless transmitter 910. Further, headpiece 900 may include a microphone (not depicted) that detects when the audio around a user and gesture object controller 918 may select to output an audio gesture object when the noise is below a particular level and to output a tactile detectable gesture object when the noise is above a particular level. Thus, gesture object controller 918 adjusts the category of gesture object selected based on the types of communications detected around the user.

Figure 11:
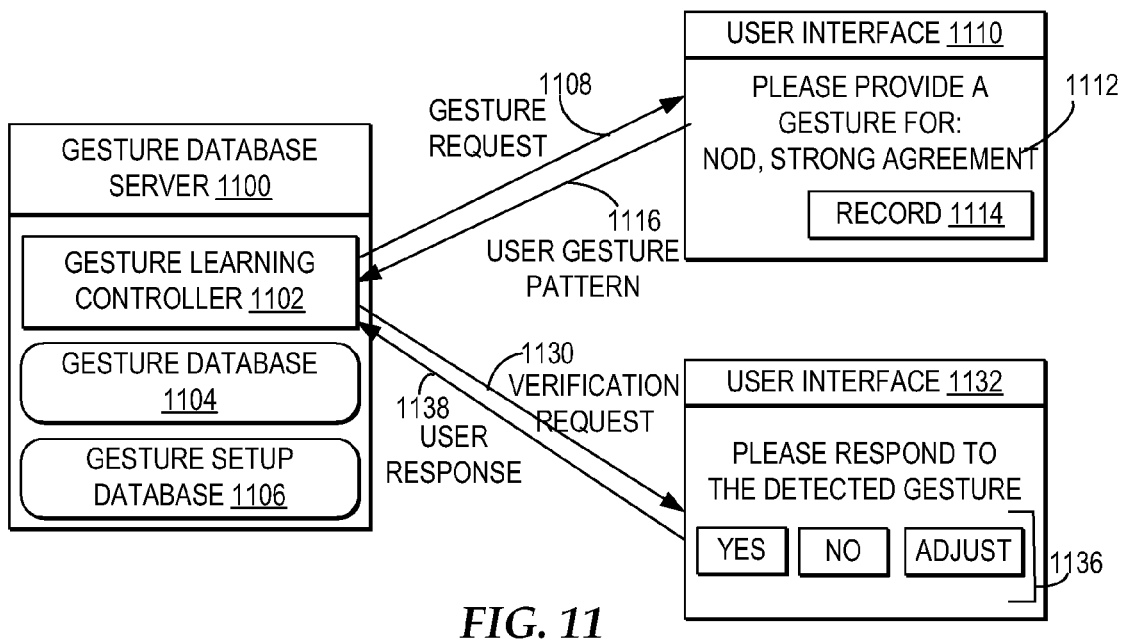
FIG. 11 is a block diagram illustrating one example of a gesture learning controller for a gesture database system.

With reference now to FIG. 11, a block diagram illustrates one example of a gesture learning controller for a gesture database system. In the example, a gesture database server 1100 includes a gesture learning controller 1102, a gesture database 1104, and a gesture setup database 1106. Gesture setup database 1106 includes a database of requested gestures for performance by a user to establish a gesture profile for the user in gesture database 1104. In the example, gesture learning controller 1102 sends a gesture set up request 1108 to a client system for display within a user interface 1110. As illustrated at reference numeral 1112, in the example, the gesture setup request requests that the user nod a nod indicating strong agreement. The user may select a selectable option to record, as illustrated at reference numeral 1114, within user interface 1110. Upon selection, the video images captured of the user are sent as a user gesture pattern 1116 to gesture database server 1100. In particular, gesture learning controller 1102 controls display of the request and recording of the user's pattern, for example, through communication with a browser, through an applet, or through interfacing options available at the client system.

Gesture learning controller 1102 receives gesture patterns and may pass the gesture patterns through a 3D gesture detector. Thus, gesture learning controller 1102 learns the 3D object properties of a particular gesture in response to a request for a particular type of gesture.

In learning a user's typical gesture patterns, gesture learning controller 1102 updates a gesture database 1104 with a base set of gestures made by a particular person. In particular, in requesting the user to gesture, gesture setup database 1106 may include entries for setting up a same gesture, but varied by time of day, location, or other environmental factors. In addition, particular setup database 1106 may include entries for setting up a same gesture, but varied by intensity to indicate different levels of response. Further, particular setup database 1106 may include entries for setting up a particular gesture in association with other gestures, to indicate different meanings. For example, the meaning of a particular hand gesture may change based on the accompanying facial expression.

Gesture database 1104 specifies each gesture definition entry according to multiple gesture description factors, including but not limited to, gesture name, a 3D gesture properties mapping, body part detected, type of movement, speed of movement, frequency, span of movement, depth of movement, skin or body temperature, and skin color. In addition, gesture database 1104 specifies each gesture entry with factors affecting the meaning of a gesture including, but not limited to, a gesture intensity, gestures made in association with the gesture, environmental factors, a user ID, an associated gesture-enabled application, and other factors that effect the definition of the particular gesture mapping. Further, gesture database 1104 includes entries for tracking adjustments made to each gesture definition entry. In addition, gesture database 1104 includes entries for tracking each time a user verified that the particular gesture definition matched a predicted gesture.

In particular, a 3D gesture detection service or a gesture interpreter service may trigger gesture learning controller 1102 to query a user as to whether a predicted gesture correctly describes the actual gesture made by the user. In the example, gesture learning controller 1102 transmits a verification request 1130 to a client system for display within a user interface 1132. As depicted, user interface 1132 includes a request illustrated at reference numeral 1134 for the user to verify whether a particular detected gesture was a nod. In one example, gesture learning controller 1102 may transmit a clip of the captured video image that includes the predicted gesture. The user may then select a response from one of selectable options 1136, which includes a selectable button of "yes", a selectable button of "no", or a selectable button of "adjust". By selecting to "adjust", the user is further prompted to indicate what gesture should have been predicted.

In alternate embodiments, gesture learning controller 1102 may query a user via other output interfaces. For example, gesture learning controller 1102 may send an audio output query to earphones or another output interface, requesting the user to indicate whether the user just performed a particular gesture; the user could respond by speaking an answer, typing an answer, selecting an answer in a display interface, or by making a gesture that indicates a response. In another example, a gesture learning controller 1102 may provide feedback to a user via tactile feedback devices, where the feedback indicates to the user what gesture the user was just detected as making; a user may indicate through other inputs whether the tactile feedback is indicative of the gesture the user intended to make.

Figures 12, 13:
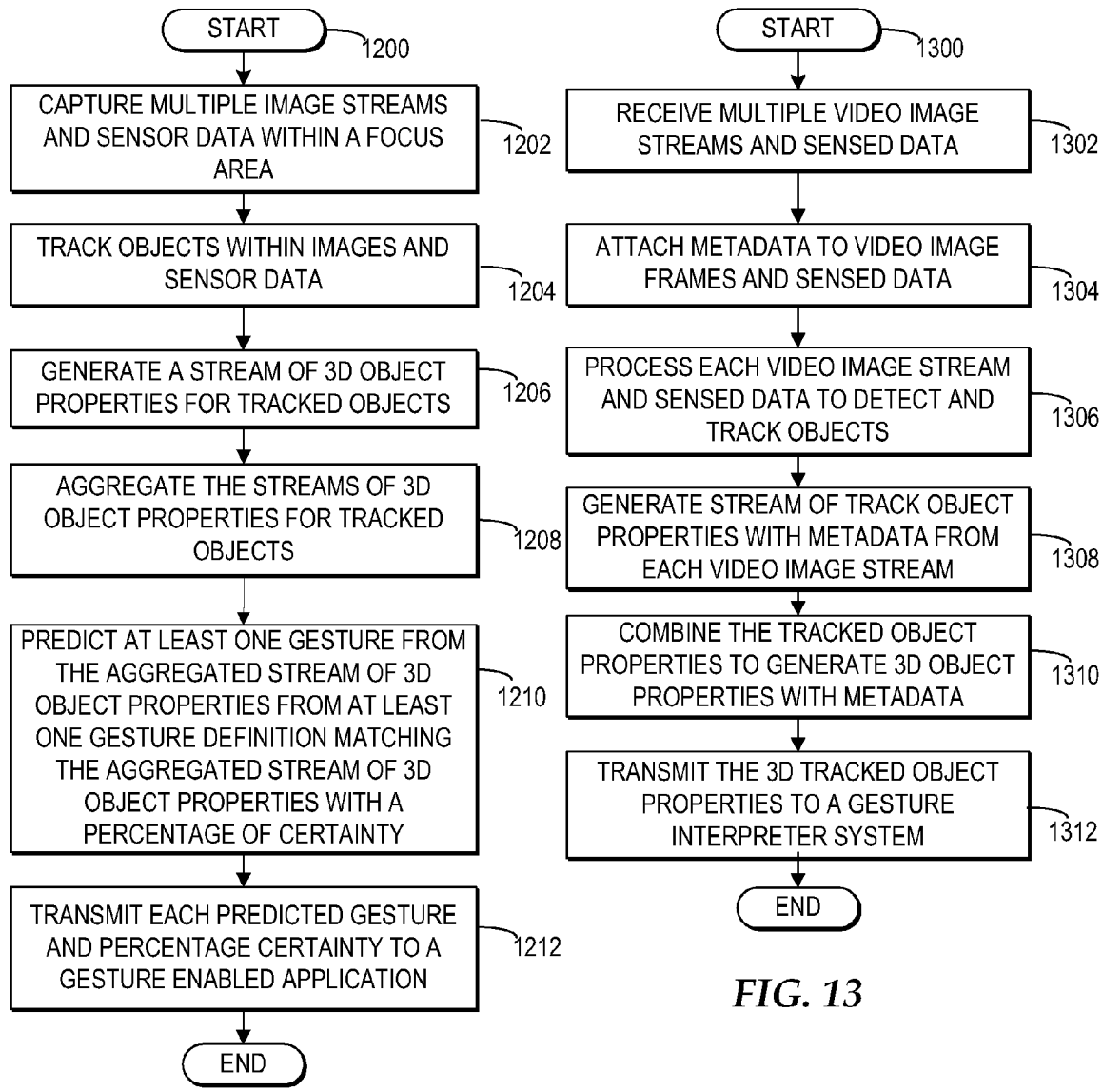
FIG. 12 is a high level logic flowchart depicting a process and program for a gesture processing system to predict gestures with a percentage certainty.
FIG. 13 is a high level logic flowchart illustrating a process and program for gesture detection by tracking objects within image streams and other sensed data and generating 3D object properties for the tracked objects.

Referring now to FIG. 12, a high level logic flowchart depicts a process and program for a gesture processing system to predict gestures with a percentage certainty. In the example, the process starts at block 1200, and thereafter proceeds to block 1202. Block 1202 depicts capturing, via a stereoscopic image capturing device, multiple image streams and via sensors, sensor data, within a focus area. Next, block 1204 illustrates tracking objects within the images and sensor data. Thereafter, block 1206 depicts generating a stream of 3D object properties for tracked objects. Thereafter, block 1208 depicts aggregating the 3D object properties for each of the tracked objects. Next, block 1210 illustrates predicting at least one gesture from the aggregated stream of 3D object properties from one or more gesture definitions, from among multiple gesture definitions, that match the aggregated stream of 3D object properties with a percentage of certainty. Thereafter, block 1210 depicts transmitting each predicted gesture and percentage certainty to a gesture-enabled application, and the process ends.

With reference now to FIG. 13, a high level logic flowchart depicts a process and program for gesture detection by tracking objects within image streams and other sensed data and generating 3D object properties for the tracked objects. As illustrated, the process starts at block 1300 and thereafter proceeds to block 1302. Block 1302 depicts a gesture detector system receiving multiple video image streams, via stereoscopic image capture devices, and sensed data, via one or more sensors. Next, block 1304 illustrates the gesture detector system attaching metadata to the video image frames and sensed data, and the process passes to block 1306. In one example, metadata includes data such as, but not limited to, a camera identifier, frame number, timestamp, and pixel count. In addition, metadata may include an identifier for a user captured in the video image and for an electronic communication session participated in by the user.

Block 1306 depicts the gesture detector system processing each video image stream and sensed data to detect and track objects. Next, block 1308 illustrates generating streams of tracked object properties with metadata from each video stream. Thereafter, block 1310 depicts combining the tracked object properties to generate 3D object properties with metadata. Next, block 1312 illustrates transmitting the 3D tracked object properties to a gesture interpreter system, and the process ends.

Figure 14:
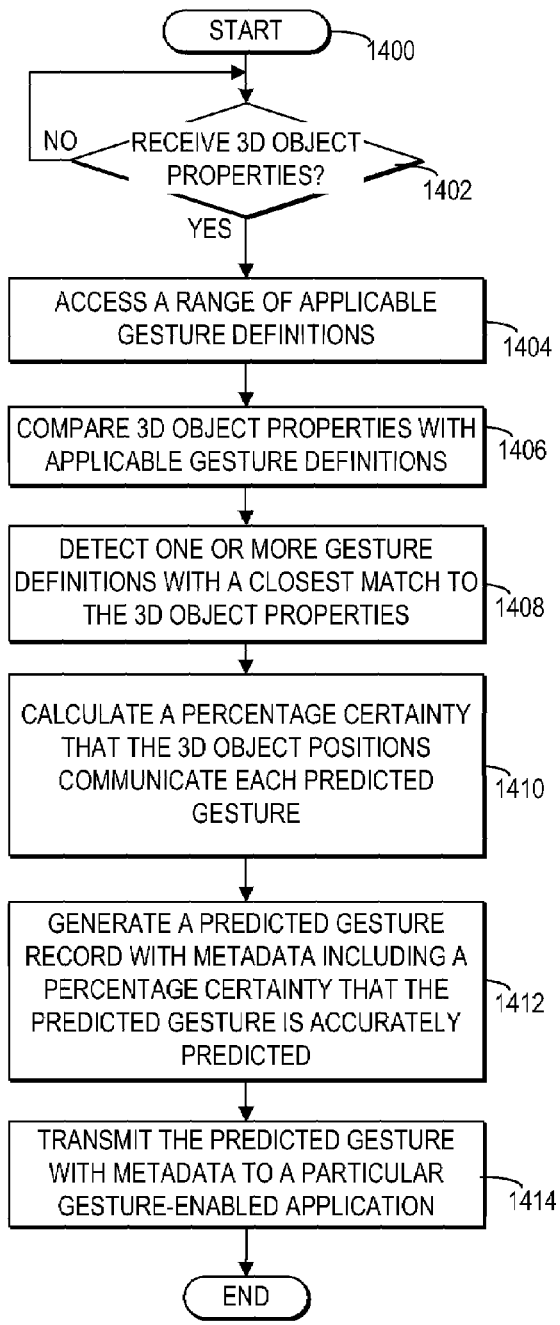
FIG. 14 is a high level logic flowchart depicting a process and program for gesture prediction from tracked 3D object properties.

Referring now to FIG. 14, a high level logic flowchart depicts a process and program for gesture prediction from tracked 3D object properties. In the example, the process starts at block 1400 and thereafter proceeds to block 1402. Block 1402 depicts a determination whether the gesture interpreter system receives 3D object properties. When the gesture interpreter system receives 3D object properties, then the process passes to block 1404. Block 1404 depicts accessing a range of applicable gesture definitions, and the process passes to block 1406. Applicable gesture definitions may vary based on the gesture-enabled application to which a predicted gesture will be transmitted. For example, if the gesture-enabled application is an electronic communication controller, then applicable gesture definitions may be selected based on a detected user ID, session ID, or communication service provider ID. In another example, if the gesture-enabled application is a tactile feedback application to a wearable tactile detectable device for providing feedback from images detected from wearable image capture devices, then applicable gesture definitions may be selected based on the identifier for the user wearing the device and based on the identities of other persons detected within the focus area of the image capture devices.

Block 1406 illustrates the gesture interpreter system comparing the 3D object properties for tracked objects with the applicable gesture definitions. Next, block 1408 depicts the gesture interpreter system detecting at least one gesture definition with a closest match to the 3D object properties for one or more of the tracked objects. Thereafter, block 1410 illustrates calculating a percentage certainty that the 3D object properties communicate each predicted gesture. Next, block 1412 depicts generating predicted gesture records with metadata including the percentage certainty that each predicted gesture is accurately predicted. Thereafter, block 1414 depicts transmitting each predicted gesture and metadata to a particular gesture-enabled application, and the process ends.

Figure 15:
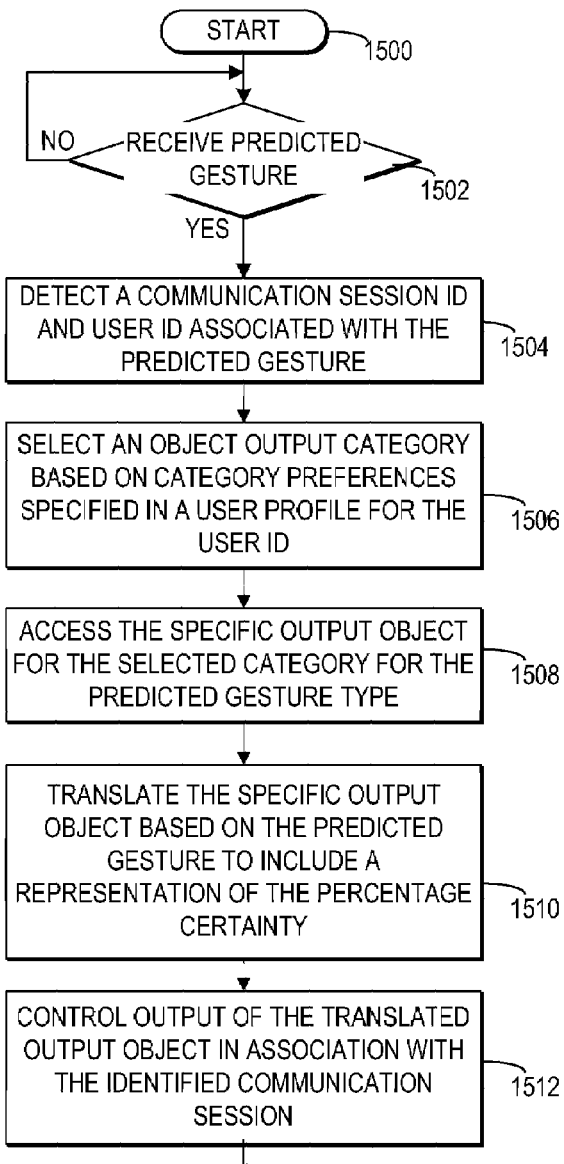
FIG. 15 is a high level logic flowchart illustrating a process and program for applying a predicted gesture in a gestured enabled electronic communication system.

With reference now to FIG. 15, a high level logic flowchart depicts a process and program for applying a predicted gesture in a gestured enabled electronic communication system. As illustrated, the process starts at block 1500 and thereafter proceeds to block 1502. Block 1502 depicts a determination whether a gestured enabled electronic communication system receives a predicted gesture with metadata. When the electronic communication system receives a predicted gesture with metadata, then the process passes to block 1504. Block 1504 depicts the electronic communication system detecting a communication session ID and user ID associated with the predicted gesture, and the process passes to block 1506. In one example, the electronic communication system may detect the communication session ID and user ID from the metadata received with the predicted gesture.

Block 1506 depicts selecting an object output category based on category preferences specified in a user profile for the user ID. Next, block 1508 illustrates accessing the specific output object for the selected category for the predicted gesture type. Thereafter, block 1510 depicts translating the specific output object based on the predicted gesture to include a representation of the percentage certainty. Next, bock 1512 illustrates controlling output of the translated output object in association with the identified communication session, and the process ends.

Figure 16:
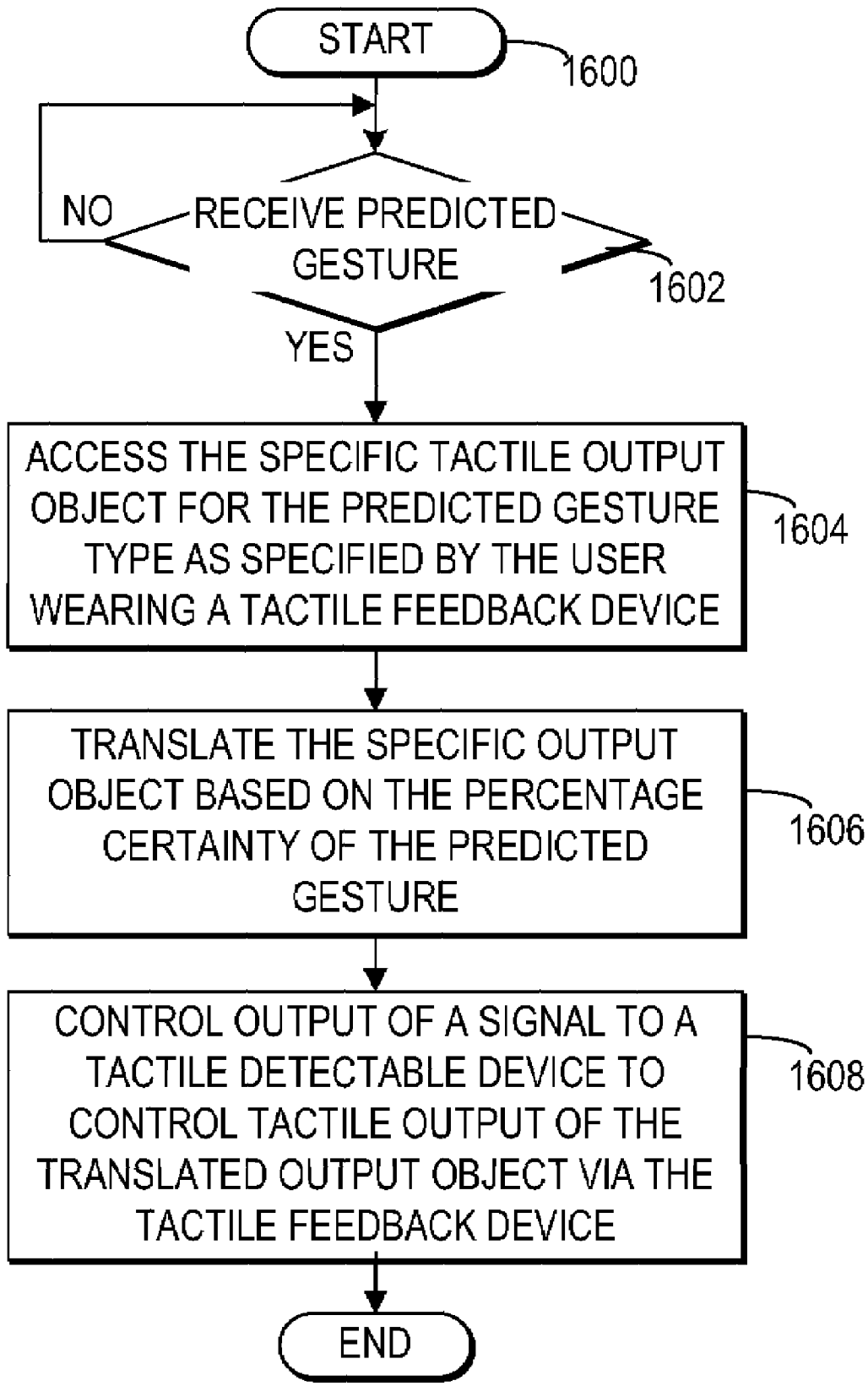
FIG. 16 is a high level logic flowchart depicting a process and program for applying a predicted gesture in a gesture-enabled tactile feedback system.

Referring now to FIG. 16, a high level logic flowchart depicts a process and program for applying a predicted gesture in a gesture-enabled tactile feedback system. As illustrated, the process starts at block 1600 and thereafter proceeds to block 1602. Block 1602 depicts a determination whether the gesture-enabled tactile feedback system receives a predicted gesture. When the gesture-enabled tactile feedback system receives a predicted gesture, the process passes to block 1604. Block 1604 illustrates the gesture-enabled tactile feedback system accessing the specific tactile output object for the predicted gesture type as specified by the user wearing a tactile feedback device. Next, block 1606 depicts translating the specific output object based on the percentage certainty of the predicted gesture. Thereafter, block 1608 illustrates controlling output of a signal to a tactile detectable device to control tactile output of the translated output object via the tactile feedback device, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for an electronic communication service that supports a plurality of electronic communication sessions to inform a plurality of users participating in an electronic communication session of gestures made by at least one of the plurality of users, comprising:

capturing a three-dimensional movement of a first user from among a plurality of users participating in an electronic communication session, wherein the three-dimensional movement is determined using at least one image capture device aimed at the first user;

identifying a three-dimensional object properties stream using the captured movement;

identifying a particular electronic communication gesture representing the three-dimensional object properties stream by comparing the identified three-dimensional object properties stream with a plurality of electronic communication gesture definitions;

displaying within a user interface, the captured movement;

prompting the first user, within the user interface, to verify the captured movement is intended to communicate the particular electronic communication gesture or to select to assign another electronic communication gesture to the captured movement;

responsive to the first user verifying the captured movement is intended to communicate the particular communication gesture, updating a record of the particular electronic communication gesture within the plurality of electronic communication gesture definitions with the verification;

responsive to the first user selecting to assign another electronic communication gesture to the capture movement, setting the particular electronic communication gesture to the another electronic communication gesture; and in response to the first user verifying the identified particular electronic communication gesture from among the plurality of electronic communication gesture definitions, transmitting to at least one of the plurality of users participating in the electronic communication session an electronic object corresponding to the identified electronic communication gesture by transmitting the electronic object as a command to a tactile detectable device to output a particular tactile detectable output pattern representative of the identified electronic communication gesture and sending the command to output the particular tactile detectable output pattern at a level of tactile pulse intensity set to a percentage of certainty.

2. The method according to claim 1, wherein capturing a three-dimensional movement of a first user further comprises:

prompting the first user, within with the user interface, to perform at least one particular type of gesture from among a plurality of types of gestures and displaying a selectable option to record within the user interface;

responsive to detecting the first user select the selectable option to record, capturing a three-dimensional movement of the first user, wherein the three-dimensional movement is determined using the at least one image capture device aimed at the first user;

identifying a three-dimensional object properties stream using the captured movement; and updating the plurality of electronic communication gesture definitions with the identified three-dimensional object properties stream indentified as said at least one particular type of gesture for said first user.

3. The method according to claim 1, wherein capturing a three-dimensional movement of a first user further comprises capturing the three-dimensional movement using at least one stereoscopic video capture device and at least one sensor enabled device to detect a depth of a detected moving object in the three-dimensional movement.

4. The method according to claim 1, wherein capturing a three-dimensional movement of the first user further comprises capturing the three-dimensional movement of the first user when the first user is actively engaged in the electronic communication session by at least one of actively speaking and actively typing.

5. The method according to claim 1, wherein identifying a particular electronic communication gesture representing the three-dimensional object properties stream further comprises:

calculating a percentage of certainty that the captured three-dimensional movement represents a particular gesture defined in the particular electronic communication gesture;

accessing a minimum prediction percentage threshold set for the particular gesture;

comparing the percentage of certainty with a minimum percentage of certainty with the calculated percentage of certainty; and responsive to the calculated percentage of certainty not exceeding the minimum percentage of certainty, prompting the user to confirm whether the particular gesture matches an intended communication by the three-dimensional movement of the user prior to transmitting the electronic object.

6. The method according to claim 5, further comprising:

adjusting a graphical transparency of the electronic object to a transparency percentage equal to the percentage of certainty.

7. The method according to claim 1, wherein transmitting to at least one of the plurality of users participating in the electronic communication session an electronic object corresponding to the identified electronic communication gesture further comprises transmitting the electronic object as a communication entry by the first user in the electronic communication session.

8. The method according to claim 1, wherein transmitting to at least one of the plurality of users participating in the electronic communication session an electronic object corresponding to the identified electronic communication gesture further comprises:

accessing, for each of the plurality of users, a separate user profile, wherein each separate user profile comprises at least one preference for a particular category of gesture object for the electronic communication session from among a plurality of categories of gesture objects, wherein the plurality of categories of gesture objects comprise at least one of text, avatar, graphic, audio, and tactile detectable feedback, wherein the preference is based on at least one factor from among a particular communicative device used by the user for the communication session, a type of the communication session, and the identities of the other users in the communication session;

selecting, from a database of a plurality of gesture objects for the identified electronic communication gesture, for each user, a separate gesture object assigned to the particular category of gesture object designated by the user in the separate user profile; and transmitting to each of the plurality of users a separate gesture object selected for each user.

9. A system for inform a plurality of users participating in an electronic communication session of gestures made by at least one of the plurality of users, comprising:

a gesture processing system comprising at least one computer system communicatively connected to a network;

said gesture processing system further comprising:

means for capturing a three-dimensional movement of a first user from among a plurality of users participating in an electronic communication session, wherein the three-dimensional movement is determined using at least one image capture device aimed at the first user;

means for identifying a three-dimensional object properties stream using the captured movement;

means for identifying a particular electronic communication gesture representing the three-dimensional object properties stream by comparing the identified three-dimensional object properties stream with a plurality of electronic communication gesture definitions;

means for displaying within a user interface, the captured movement;

means for prompting the first user, within the user interface, to verify captured movement is intended to communicate the particular electronic communication gesture or to select to assign another electronic communication gesture to the captured movement;

means, responsive to the first user verifying the captured movement is intended to communicate the particular communication gesture, for updating a record of the particular electronic communication gesture within the plurality of electronic communication gesture definitions with the verification;

means, responsive to the first user selecting to assign another electronic communication gesture to the captured movement, for setting the particular electronic communication gesture to the another electronic communication gesture; and means, in response to the first user verifying the indentified particular electronic communication gesture from among the plurality of electronic communication gesture definitions, transmitting to at least one of the plurality of users participating in the electronic communication session an electronic object corresponding to the identified electronic communication gesture; and at least one electronic communication service provider server that comprises:

means for transmitting to at least one of the plurality of users participating in the electronic communication session the electronic object corresponding to the identified electronic communication gesture, wherein the electronic object is a command to a tactile detectable device to output a particular tactile detectable output pattern representative of the identified electronic communication gesture and sending the command to output the particular tactile detectable output pattern at a level of tactile pulse intensity set to a percentage of certainty.

10. The system according to claim 9, wherein said means for capturing a three-dimensional movement of a first user further comprises:

means for promoting the first user, within with the user interface, to perform at least one particular type of gesture from among a plurality of types of gestures and displaying a selectable option to record within the user interface;

means, responsive to detecting the first user select the selectable option to record, for capturing a three-dimensional movement of the first user, wherein the three-dimensional movement is determined using the at least one image capture device aimed at the first user;

means for identifying a three-dimensional object properties stream using the captured movement; and means for updating the plurality of electronic communication gesture definitions with the identified three-dimensional object properties stream identified as said at least one particular type of gesture for said first user.

11. The system according to claim 9, wherein said means for capturing a three-dimensional movement of a first user further comprises means for capturing the three-dimensional movement using at least one stereoscopic video capture device and at least one sensor enabled device to detect a depth of a detected moving object in the three-dimensional movement.

12. The system according to claim 9, wherein said means for means for capturing a three-dimensional movement of the first user further comprises means for capturing the three-dimensional movement of the first user when the first user is actively engaged in the electronic communication session by at least one of actively speaking and actively typing.

13. The system according to claim 9, wherein said means for identifying a particular electronic communication gesture representing the three-dimensional object properties stream further comprises:

means for calculating the percentage of certainty that the captured three-dimensional movement represents a particular gesture defined in the particular electronic communication gesture;

means for accessing a minimum prediction percentage threshold set for the particular gesture;

means for comparing the percentage of certainty with a minimum percentage of certainty with the calculated percentage of certainty; and means, responsive to the calculated percentage of certainty not exceeding the minimum percentage of certainty, for prompting the user to confirm whether the particular gesture matches an intended communication by the three-dimensional movement of the user prior to transmitting the electronic object.

14. The system according to claim 13, further comprising means for adjusting a graphical transparency of the electronic object to a transparency percentage equal to the percentage of certainty.

15. The system according to claim 9, wherein said at least one electronic communication service provider server comprises means for transmitting to at least one of the plurality of users participating in the electronic communication session the electronic object corresponding to the identified electronic communication gesture, wherein the electronic object is a communication entry by the first user in the electronic communication session.

16. The system according to claim 9, further comprising:

said at least one electronic communication service provider server comprising means for accessing, for each of the plurality of users, a separate user profile, wherein each separate user profile comprises at least one preference for a particular category of gesture object for the electronic communication session from among a plurality of categories of gesture objects, wherein the plurality of categories of gesture objects comprise at least one of text, avatar, graphic, audio, and tactile detectable feedback, wherein the preference is based on at least one factor from among a particular communicative device used by the user for the communication session, a type of the communication session, and the identities of the other users in the communication session;

said at least one electronic communication service provider server further comprising means for selecting, from a database of a plurality of gesture objects for the identified electronic communication gesture, for each user, a separate gesture object assigned the particular category designated by the user in the separate user profile; and said at least one electronic communication service provider server further comprising means for transmitting to each of the plurality of users a separate gesture object selected for each user.

17. A computer program product for informing a plurality of users participating in an electronic communication session of gestures made by at least one of the plurality of users, said program embodied in a volatile or non-volatile computer-readable medium, said program comprising computer-executable instructions which cause at least one computer to perform the steps of:

capturing a three-dimensional movement of a first user from among a plurality of users participating in an electronic communication session, wherein the three-dimensional movement is determined using at least one image capture device aimed at the first user;

identifying a three-dimensional object properties stream using the captured movement;

identifying a particular electronic communication gesture representing the three-dimensional object properties stream by comparing the identified three-dimensional object properties stream with a plurality of electronic communication gesture definitions;

displaying within a user interface, the captured movement;

prompting the first user, within the user interface, to verify the captured movement is intended to communicate the particular electronic communication gesture or to select to assign another electronic communication gesture to the captured movement;

responsive to the first user verifying the captured movement is intended to communicate the particular communication gesture, updating a record of the particular electronic communication gesture within the plurality of electronic communication gesture definitions with the verification;

responsive to the first user selecting to assign another electronic communication gesture to the captured movement, setting the particular electronic communication gesture to the another electronic communication gesture; and in response to the first user verifying the identified particular electronic communication gesture from among the plurality of electronic communication gesture definitions, transmitting to at least one of the plurality of users participating in the electronic communication session an electronic object corresponding to the identified electronic communication gesture by transmitting the electronic object as a command to a tactile detectable device to output a particular tactile detectable output pattern representative of the identified electronic communication gesture and sending the command to output the particular tactile detectable output pattern at a level of tactile pulse intensity set to a percentage of certainty.

18. The program according to claim 17, wherein identifying a particular electronic communication gesture representing the three-dimensional object properties stream further comprises:

calculating the percentage of certainty that the captured three-dimensional movement represents a particular gesture defined in the particular electronic communication gesture; and adjusting at least one output characteristic of the electronic object to represent the percentage of certainty.

* * * * *